(12) United States Patent
Kitaura

(10) Patent No.: US 8,120,470 B2
(45) Date of Patent: Feb. 21, 2012

(54) METHOD OF AND APPARATUS FOR CONTROLLING ELECTRONIC APPLIANCE

(75) Inventor: Masahiro Kitaura, Kanagawa-ken (JP)

(73) Assignee: Victor Company of Japan, Limited, Yokohama-shi (JP)

(*) Notice: Subject to any disclaimer, the term of this patent is extended or adjusted under 35 U.S.C. 154(b) by 923 days.

(21) Appl. No.: 12/000,308

(22) Filed: Dec. 11, 2007

(65) Prior Publication Data

US 2009/0002191 A1 Jan. 1, 2009

(30) Foreign Application Priority Data

Dec. 13, 2006 (JP) .............. P2006-335277
Nov. 30, 2007 (JP) .............. P2007-310228

(51) Int. Cl.
G05B 11/01 (2006.01)
G08C 19/16 (2006.01)
G09B 21/00 (2006.01)
G07C 9/00 (2006.01)

(52) U.S. Cl. .... 340/12.5; 340/4.1; 340/11.1; 340/12.15; 340/12.22; 340/12.1

(58) Field of Classification Search ............ 340/825.19, 340/57, 64, 65, 72, 5.72; 341/178, 176; 367/197, 367/198, 199; 704/271, 275; 381/110
See application file for complete search history.

(56) References Cited

U.S. PATENT DOCUMENTS

| | | | | |
|---|---|---|---|---|
| 4,129,886 A | * | 12/1978 | Shih | 455/151.2 |
| 5,561,737 A | * | 10/1996 | Bowen | 704/275 |
| 5,615,271 A | * | 3/1997 | Stevens et al. | 381/110 |
| 5,677,675 A | * | 10/1997 | Taylor et al. | 340/571 |
| 6,141,426 A | * | 10/2000 | Stobba et al. | 381/110 |
| 7,426,467 B2 | * | 9/2008 | Nashida et al. | 704/275 |
| 2006/0182291 A1 | * | 8/2006 | Kunieda et al. | 381/110 |
| 2006/0227004 A1 | * | 10/2006 | Liow et al. | 340/825.69 |

FOREIGN PATENT DOCUMENTS

| | | | |
|---|---|---|---|
| CN | 1453997 A | * | 11/2003 |
| JP | 3-54989 A | | 3/1991 |
| JP | 3-184497 A | | 8/1991 |

OTHER PUBLICATIONS

Translation of CN 1453997 A by Scientific and Technology Information Center (STIC), Keisha Douglas, whole document.*

* cited by examiner

Primary Examiner — Daniel Wu
Assistant Examiner — Emily C Terrell
(74) Attorney, Agent, or Firm — The Nath Law Group; Jerald L. Meyer; Stanley N. Protigal

(57) ABSTRACT

An edge signal extractor generates an edge signal according to a sound wave generated for controlling the electronic appliance. According to the edge signal, an edge pulse generator generates an edge pulse. If a predetermined number of such edge signals are generated, a controller displays, on a display of the electronic appliance, one of menu images associated with control operations of the electronic appliance in an active state. The controller alternately displays, in an active state, the menu images on the display at predetermined intervals. When the edge pulse is generated, the controller carries out the control operation associated with the presently displayed menu image with respect to an electronic appliance.

15 Claims, 15 Drawing Sheets

FIG. 8
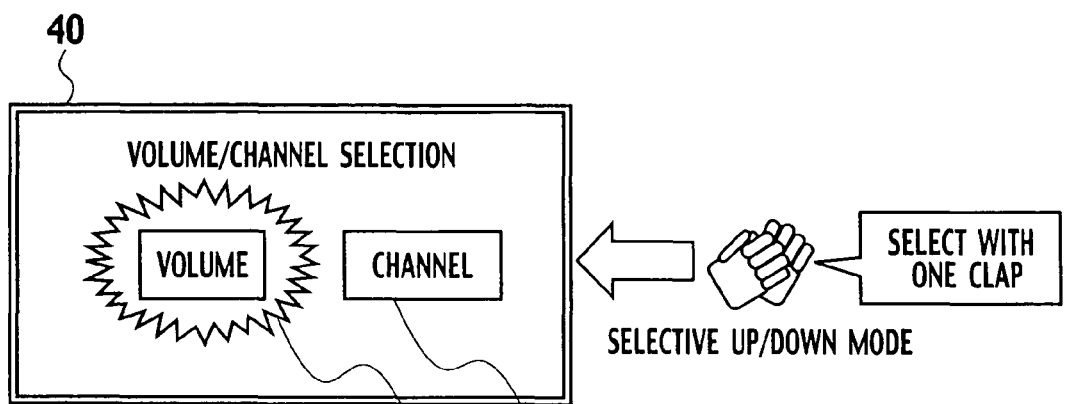
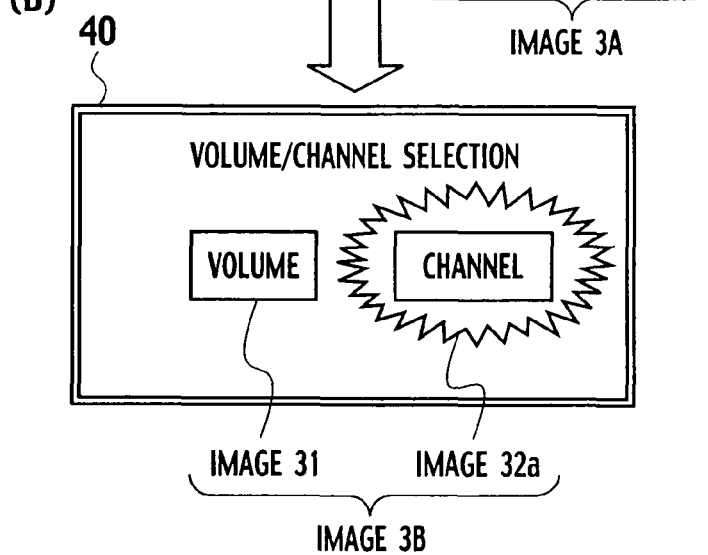

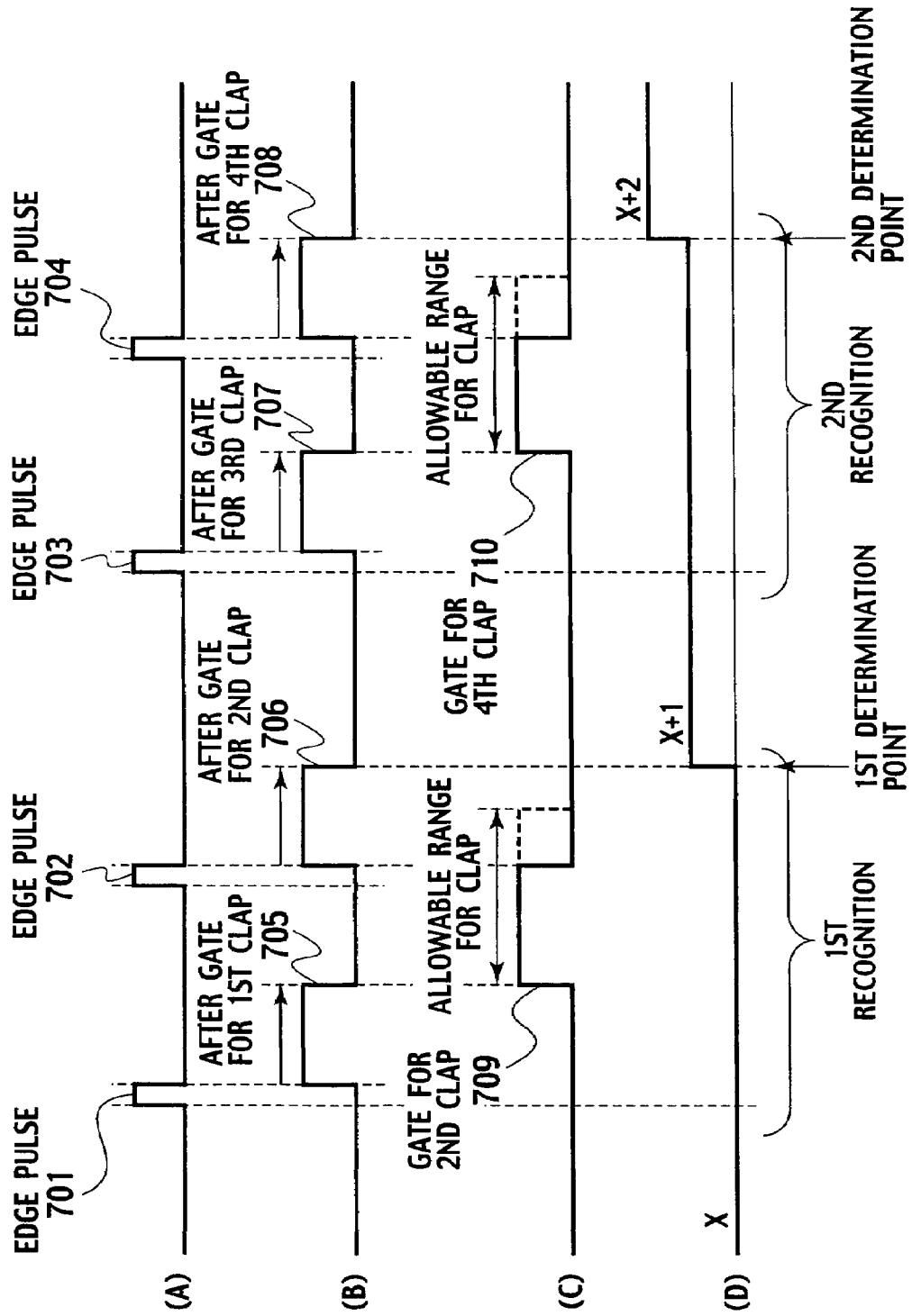

METHOD OF AND APPARATUS FOR CONTROLLING ELECTRONIC APPLIANCE

BACKGROUND OF THE INVENTION

1. Field of the Invention

The present invention relates to a method of and an apparatus for controlling an electronic appliance, and particularly, to a method of and an apparatus for remotely controlling an electronic appliance without a remote controller.

2. Description of Related Art

Present electronic appliances such as television sets, audio units, and air conditioners are controllable by touching control buttons installed on the appliances proper or by manipulating remote controllers from a distance. To touch control buttons installed on the body of an electronic appliance, the user must come closer to the appliance. If the user is far from the appliance, moving close to the appliance for controlling the same is bothersome. The remote controller will solve this problem.

The remote controller allows the user to control the electronic appliance without approaching the appliance. However, if the remote controller is not in the user's hand, the user must move around to find the same. This is laborious for the user particularly when the user has no intention of continuously controlling the appliance but only wants to conduct a simple operation, for example, turning on the appliance. Also frequently happening is that the user cannot find out the remote controller when the user really needs it.

Japanese Unexamined Patent Application Publications No. H03-54989 and No. H03-184497 each disclose a method of controlling an electronic appliance with claps instead of a remote controller.

When controlling an electronic appliance with claps, what is desired is to selectively execute a plurality of control operations with respect to the appliance by clapping. To realize this, the control operations must be identified by, for example, changing the number or rhythm of claps. This, however, forces the user to memorize every pattern associated with each control operation and makes it difficult for the user to correctly specify a desired control operation. Also, a malfunction will occur if the electronic appliance erroneously recognizes claps.

SUMMARY OF THE INVENTION

An object of the present invention is to provide a method of and an apparatus for controlling an electronic appliance, capable of allowing a user to correctly control the electronic appliance with, for example, claps through excellent operability without errors.

In order to accomplish the object, the following aspects (a) to (o) of the present invention are provided.

An aspect (a) of the present invention provides a method of controlling an electronic appliance. The method includes collecting a sound wave generated for controlling the electronic appliance; acoustoelectrically converting the collected sound wave into a sound signal; generating an edge signal according to the sound signal, the edge signal indicating the generation timing of the sound wave; generating an edge pulse according to the edge signal; after the generation of a predetermined number of such edge pulses, displaying a control image in an active state on a display of the electronic appliance, the displayed control image being selected from among a plurality of control images that are associated with a plurality of control operations of the electronic appliance, respectively; cyclically displaying the plurality of control images in an active state on the display at predetermined intervals; and carrying out the control operation associated with the control image that is displayed in an active state on the display at the time when the edge pulse is generated.

According to an aspect (b) of the present invention, the method of the aspect (a) further includes turning on the electronic appliance if a predetermined number of edge pulses are generated in an OFF state of the electronic appliance and turning off the electronic appliance if a predetermined number of edge pulses are generated in an ON state of the electronic appliance.

According to an aspect (c) of the present invention, the method of the aspect (a) further includes stopping cyclically displaying the plurality of control images if no edge pulse is generated within a first set period that is longer than a period in which the plurality of control images are cyclically displayed once.

According to an aspect (d) of the present invention, the method of the aspect (a) further includes stopping cyclically displaying the plurality of control images if the edge pulse is generated when one of the plurality of control images is displayed in an active state on the display; and resuming cyclically displaying the plurality of control images if no edge pulse is generated within a second set period after the stoppage of cyclical display.

According to an aspect (e) of the present invention, the method of the aspect (a) further includes stopping cyclically displaying the plurality of control images if the edge pulse is generated when one of the plurality of control images is displayed in an active state on the display; and resuming cyclically displaying the plurality of control images if edge pulses are generated after the stoppage of cyclical display and if no edge pulse is generated within a second set period after the last one of the edge pulses generated after the stoppage of cyclical display.

According to an aspect (f) of the present invention, the method of the aspect (a) further includes generating an absolute-value sound signal from the sound signal by using an average level of the sound signal as a reference, wherein the edge signal is generated by extracting a part of the absolute-value sound signal that has a high-frequency component exceeding a predetermined frequency and a level exceeding a first threshold; and the edge pulse is generated when the level of the generated edge signal exceeds a second threshold.

An aspect (g) of the present invention provides a method of controlling an electronic appliance. The method includes collecting a sound wave generated for controlling the electronic appliance; acoustoelectrically converting the collected sound wave into a sound signal; generating an edge signal according to the sound signal, the edge signal representing the generation timing of the sound wave; generating an edge pulse according to the edge signal; after the generation of a predetermined number of such edge pulses, outputting a control sound from a speaker, the output control sound being selected from among a plurality of control sounds that are associated with a plurality of control operations of the electronic appliance, respectively; cyclically outputting the plurality of control sounds at predetermined intervals; and carrying out the control operation associated with the control sound that is output at the time when the edge pulse is generated.

An aspect (h) of the present invention provides an apparatus for controlling an electronic appliance. The apparatus includes a sound collector configured to collect a series of sound waves generated at predetermined intervals for controlling the electronic appliance and acoustoelectrically convert the collected sound waves into a sound signal; an edge signal extractor configured to generate an edge signal according to the sound signal, the edge signal indicating individual generation timing of the series of sound waves; an edge pulse generator configured to generate an edge pulse according to the edge signal; a display; a display controller configured to display a control image in an active state on the display, the displayed control image being selected from among a plurality of control images that are associated with a plurality of control operations of the electronic appliance, respectively, and cyclically display the plurality of control images in an active state at predetermined intervals; and an operation controller configured to carry out the control operation associated with the control image that is displayed in an active state on the display at the time when the edge pulse is generated.

According to an aspect (i) of the present invention that is based on the aspect (h), the display controller displays one of the control images in an active state on the display after a predetermined number of edge pulses are generated.

According to an aspect (j) of the present invention, the apparatus of the aspect (h) further includes a power controller configured to turn on the electronic appliance if a predetermined number of edge pulses are generated in an OFF state of the electronic appliance and turn off the electronic appliance if a predetermined number of edge pulses are generated in an ON state of the electronic appliance.

According to an aspect (k) of the present invention that is based on the aspect (h), the display controller stops cyclically displaying the plurality of control images if no edge pulse is generated by the edge pulse generator within a first set period that is longer than a period in which the plurality of control images are cyclically displayed once.

According to an aspect (l) of the present invention that is based on the aspect (h), the display controller stops cyclically displaying the plurality of control images if the edge pulse is generated a predetermined number of times when one of the plurality of control images is displayed in an active state on the display; and resumes cyclically displaying the plurality of control images if no edge pulse is generated within a second set period after the stoppage of cyclical display.

According to an aspect (m) of the present invention that is based on the aspect (h), the display controller stops cyclically displaying the plurality of control images if the edge pulse is generated a predetermined number of times when one of the plurality of control images is displayed in an active state on the display; and resumes cyclically displaying the plurality of control images if edge pulses are generated after the stoppage of cyclical display and if no edge pulse is generated within a second set period after the last one of the edge pulses generated after the stoppage of cyclical display.

According to an aspect (n) of the present invention, the apparatus of the aspect (h) further includes an absolute-value unit configured to generate an absolute-value sound signal from the sound signal provided by the sound collector, by using an average level of the sound signal as a reference, wherein the edge signal extractor generates an edge signal by extracting a part of the absolute-value sound signal that has a high-frequency component exceeding a predetermined frequency and a level exceeding a first threshold; and the edge pulse generator generates an edge pulse when the level of the generated edge signal exceeds a second threshold.

An aspect (o) of the present invention provides an apparatus for controlling an electronic appliance. The apparatus includes a sound collector configured to collect a series of sound waves generated at predetermined intervals for controlling the electronic appliance and acoustoelectrically convert the collected sound waves into a sound signal; an edge signal extractor configured to generate an edge signal according to the sound signal, the edge signal indicating individual generation timing of the series of sound waves; an edge pulse generator configured to generate an edge pulse according to the edge signal; a speaker configured to electroacoustically convert a sound signal into an acoustic signal; a sound signal controller configured to output a control sound from the speaker, the output control sound being selected from among a plurality of control sounds that are associated with a plurality of control operations of the electronic appliance, respectively, and cyclically output the plurality of control sounds at predetermined intervals; and an operation controller configured to carry out the control operation associated with the control sound that is output at the time when the edge pulse is generated.

These aspects of the present invention enable the user of the electronic appliance to correctly control the appliance with, for example, claps through excellent operability without errors.

BRIEF DESCRIPTION OF THE DRAWINGS

In the accompanying drawings:

FIG. 8 shows menu images 3A and 3B toggled according to the first embodiment;

FIG. 16 is a timing chart showing another determination algorithm of the selective UP/DOWN mode.

DESCRIPTION OF THE EMBODIMENTS

The embodiments of the present invention will be explained with reference to the drawings. The present invention controls an electronic appliance in response to sound waves such as claps provided by user at predetermined intervals.

Figure 1:
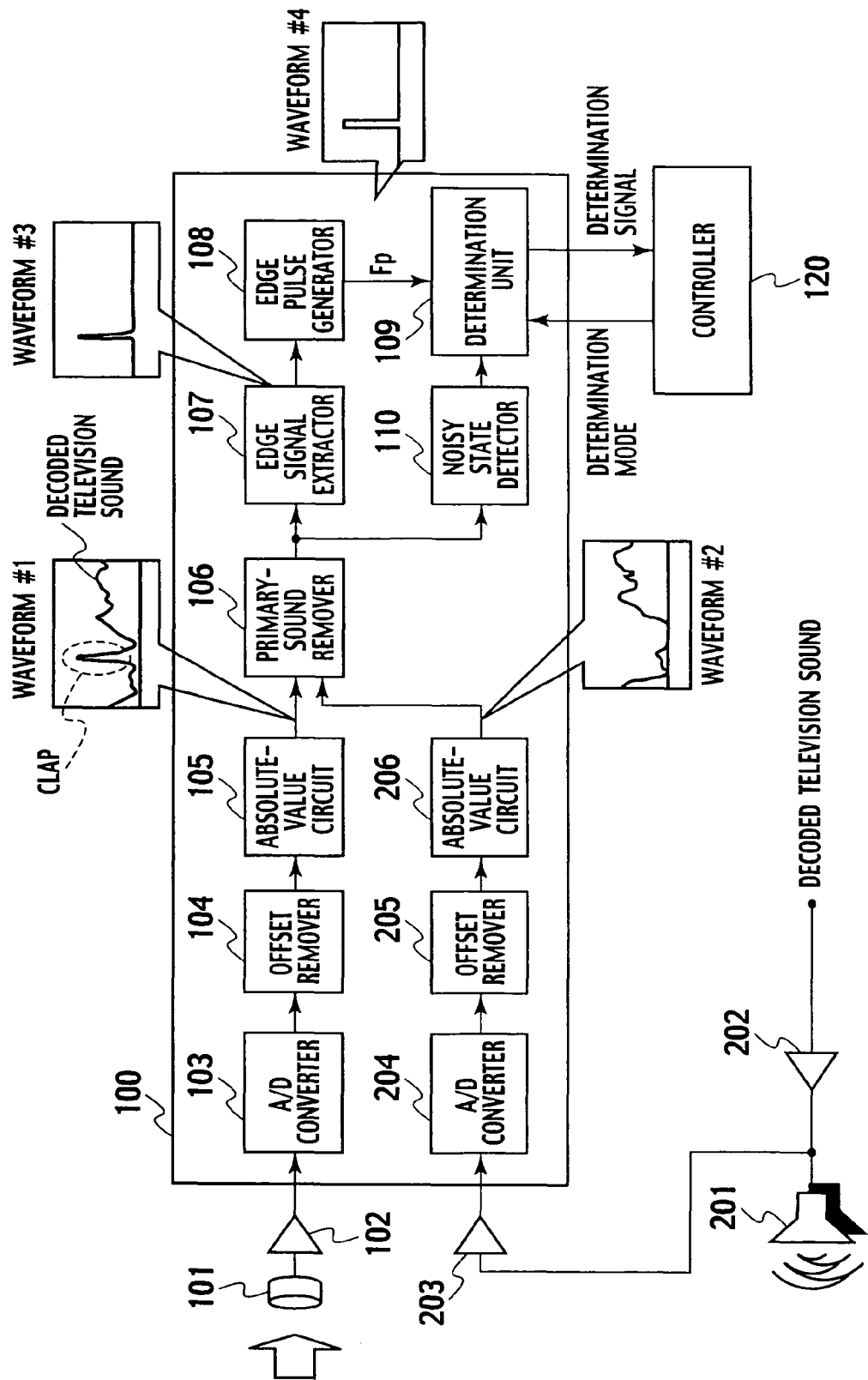
FIG. 1 is a block diagram showing an electronic appliance incorporating a controlling apparatus according to a first embodiment of the present invention.

FIG. 1 is a block diagram showing an electronic appliance incorporating an apparatus for controlling the electronic appliance according to the first embodiment of the present invention. The electronic appliance is, for example, a television set. In FIG. 1, the electronic appliance includes a microphone 101 to collect claps made by user, an amplifier 102 to amplify an analog audio signal provided by the microphone 101, a primary amplifier 202 to amplify an audio signal such as a decoded television audio signal provided by an existing audio detector of the electronic appliance, a primary speaker 201, and an amplifier 203 to amplify the audio signal provided by the primary amplifier 202. The controlling apparatus according to the first embodiment includes a clap recognition unit 100 that receives the analog audio signal from the amplifier 102 and the decoded television audio signal from the amplifier 203. The recognition unit 100 recognizes claps and outputs a determination signal.

The clap recognition unit 100 includes A/D converters 103 and 204, offset removers 104 and 205 to remove offset components of digital audio signals provided by the A/D converters 103 and 204, absolute-value circuits 105 and 206 to provide absolute-value audio signals according to the offset-removed digital audio signals, and a primary-sound remover 106 to remove a primary audio signal generated by the electronic appliance according to the absolute-value audio signals provided by the absolute-value circuits 105 and 206 and provide an audio signal mainly containing a clap component. The recognition unit 100 also includes an edge signal extractor 107 to receive the audio signal from the primary-sound remover 106, a noisy state detector 112 to receive the audio signal from the primary-sound remover 106, an edge pulse generator 108 to generate an edge pulse according to an edge signal provided by the edge signal extractor 107, and a determination unit 109 to determine the number and timing of claps according to edge pulses from the edge pulse generator 108, an output signal from the noisy state detector 112, and a determination mode from a controller 120.

Operation of the electronic appliance and the controlling apparatus according to the first embodiment will be explained. The microphone 101 is arranged at a predetermined position of the television set (electronic appliance), to collect claps made by the user and acoustoelectrically convert the collected sound into an analog audio signal. The analog audio signal is amplified by the amplifier 102 to a signal having an amplitude level that is optimum for a dynamic range of the A/D converter 103. The A/D converter 103 converts the analog audio signal into a digital audio signal, which is supplied to the offset remover 104. The digital audio signal from the A/D converter 103 may be processed by software or hardware in the functional blocks that follow the A/D converter 103. The present invention can employ any of the hardware processing, the software processing, and a combination thereof.

Figure 2:
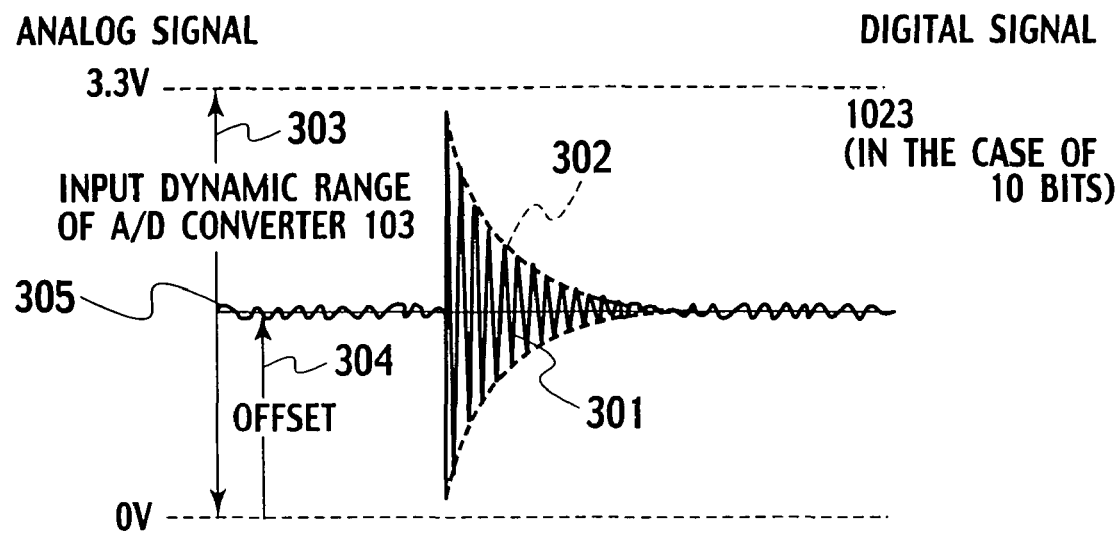
FIG. 2 is a view showing an input waveform of an A/D converter 103 incorporated in the controlling apparatus of FIG. 1 and a relationship between signals before and after A/D conversion.

As shown in FIG. 2, an analog signal before A/D conversion and a digital signal after A/D conversion each include an offset component 304 adjusted to an input dynamic range 303 of the A/D converter 103. In the example of FIG. 2, the dynamic range 303 is from 0V to 3.3V. The offset component 304 is unnecessary for the processes that follow the A/D converter 103 because these processes do not handle the offset component 304.

Figure 3:
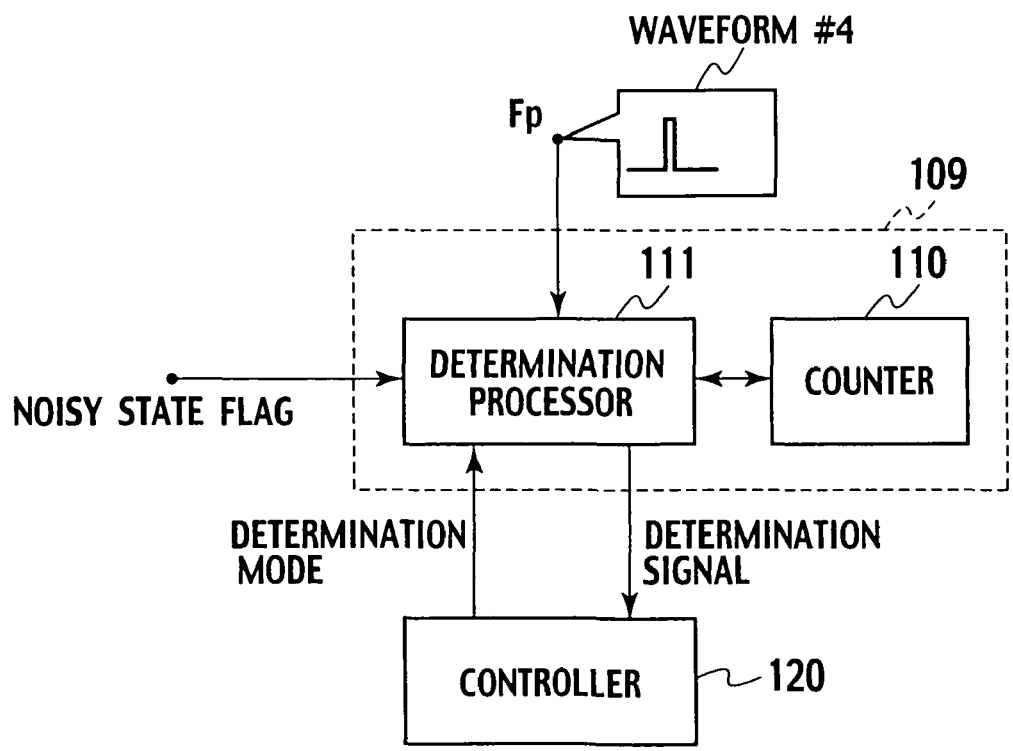
FIG. 3 is a block diagram showing an example of a determination unit 109 incorporated in the controlling apparatus of FIG. 1.

An actual wave signal involves various frequency components and amplitudes as indicated with a wave signal 301 of FIG. 2. For the sake of easy understanding, wave signals shown in FIGS. 1 and 3 are simplified into envelopes such as an envelope 302 shown in FIG. 2. It must be noted that actual signal processing is carried out on the actual wave signal 301, not on the envelope 302.

When converting an analog signal into a digital signal, the A/D converter 103 divides a voltage level with resistors so that a silent level 305 comes to the center of the dynamic range 303 of the A/D converter 103 as shown in FIG. 2. The silent level 305 is nearly equal to an average of the amplitudes of the wave signal 301.

Returning to FIG. 1, the offset remover 104 employs a high-pass filter (HPF) to attenuate low-frequency components of the digital audio signal, thereby removing an offset from the digital audio signal.

The offset-removed digital audio signal is processed by the absolute-value circuit 105 into an absolute-value signal having a waveform #1 shown in FIG. 1. The absolute-value signal of waveform #1 represents absolute values based on an average level of the analog audio signal collected by the microphone 101.

A decoded television audio signal is amplified by the primary amplifier 202 into a signal having a level appropriate for the primary speaker 201. The primary speaker 201 electroacoustically converts the amplified signal and outputs the converted signal.

The microphone 101 receives a sound wave representative of the audio signal from the primary speaker 201, as well as a sound wave representative of a clap produced by the user to control the electronic appliance. Accordingly, the absolute-value signal of waveform #1 provided by the absolute-value circuit 105 contains both the clap and decoded television audio signal collected by the microphone 101.

The audio signal amplified by the primary amplifier 202 is further amplified by the amplifier 203 and is supplied to the A/D converter 204. The A/D converter 204 converts the input analog audio signal into a digital audio signal and supplies the digital audio signal to the offset remover 205. The offset remover 205 employs a high-pass filter (HPF) to attenuate low-frequency components of the digital audio signal, thereby removing an offset from the digital audio signal. The offset-removed digital audio signal is changed by the absolute-value circuit 206 into an absolute-value signal.

The absolute-value signal from the absolute-value circuit 206 has a waveform #2 shown in FIG. 1. The absolute-value signal of waveform #2 represents absolute values based on an average level of the analog audio signal provided by the primary amplifier 202.

The absolute-value signal of waveform #2 is close to a signal formed by removing a clap signal from the absolute-value signal of waveform #1.

The primary-sound remover 106 subtracts the absolute-value signal of waveform #2 from the absolute-value signal of waveform #1, to cancel the primary audio signal (decoded television audio signal) collected by the microphone 101 and is contained in the absolute-value signal of waveform #1. This canceling is carried out by generating a signal from the absolute-value signal of waveform #2 in consideration of the propagation characteristic of a transmission path from the primary speaker 201 to the microphone 101 and by subtracting the generated signal from the absolute-value signal of waveform #1.

In this way, the primary-sound remover 106 cancels the primary sound contained in the absolute-value signal provided by the absolute-value circuit 105. As a result, an audio signal provided by the primary-sound remover 106 represents the clap made by the user, sound other than the clap, and residual weak primary sound components that have not been canceled. An explosive sound such as a clap is an impulse sound that has large energy and involves a full frequency band. It is possible, therefore, to catch an edge indicative of the clap and separate the clap from the other sound components.

The edge signal extractor 107 extracts an edge from the audio signal provided by the primary-sound remover 106 and outputs an edge signal having a waveform #3 shown in FIG. 1. For example, the edge signal extractor 107 extracts, as an edge signal, a high-frequency component that is higher than a predetermined frequency and has a level exceeding a first threshold.

Using the edge signal of waveform #3, the edge pulse generator 108 generates an edge pulse having a waveform #4 shown in FIG. 1. For example, the edge pulse generator 108 generates an edge pulse (edge detected flag) FP if the level of the edge signal of waveform #3 exceeds a second threshold. The edge pulse FP is supplied as a clap detected signal to the determination unit 109.

According to the output signal from the primary-sound remover 106, the noisy state detector 112 evaluate an environment noise level around the user. If the noise level is improperly high to recognize claps, the noisy state detector 112 provides the determination unit 109 with a noisy state flag.

For example, the noisy state detector 112 compares the absolute-value signal from the primary-sound remover 106 with a third threshold. If a level of the absolute-value signal is equal to or larger than the third threshold, the noisy state detector 112 accumulates the level, and if the level is smaller than the third threshold, the noisy state detector 112 deducts the level, thereby providing a cumulative value. If the cumulative value exceeds a fourth threshold that is larger than the third threshold, the noisy state detector 112 determines that it is a noisy state and sets the noisy state flag having a predetermined value.

The determination unit 109 evaluates the edge pulse FP from the edge pulse generator 108 according to a determination algorithm and provides a determination signal if determination conditions are met. The determination conditions are changed according to a determination mode to be provided from the controller 120 to the determination unit 109. If the noisy state flag is received from the noisy state detector 112, the determination unit 109 stops the clap recognition process and prohibits outputting a determination signal. This prevents large television sound or environment sound from erroneously being recognized as claps, thereby preventing a malfunction of the electronic appliance in a noisy state.

The noisy state detector 112 is preferable because it can improve resistance to malfunction. However, it is possible to omit the noisy state detector 112.

Figure 4:
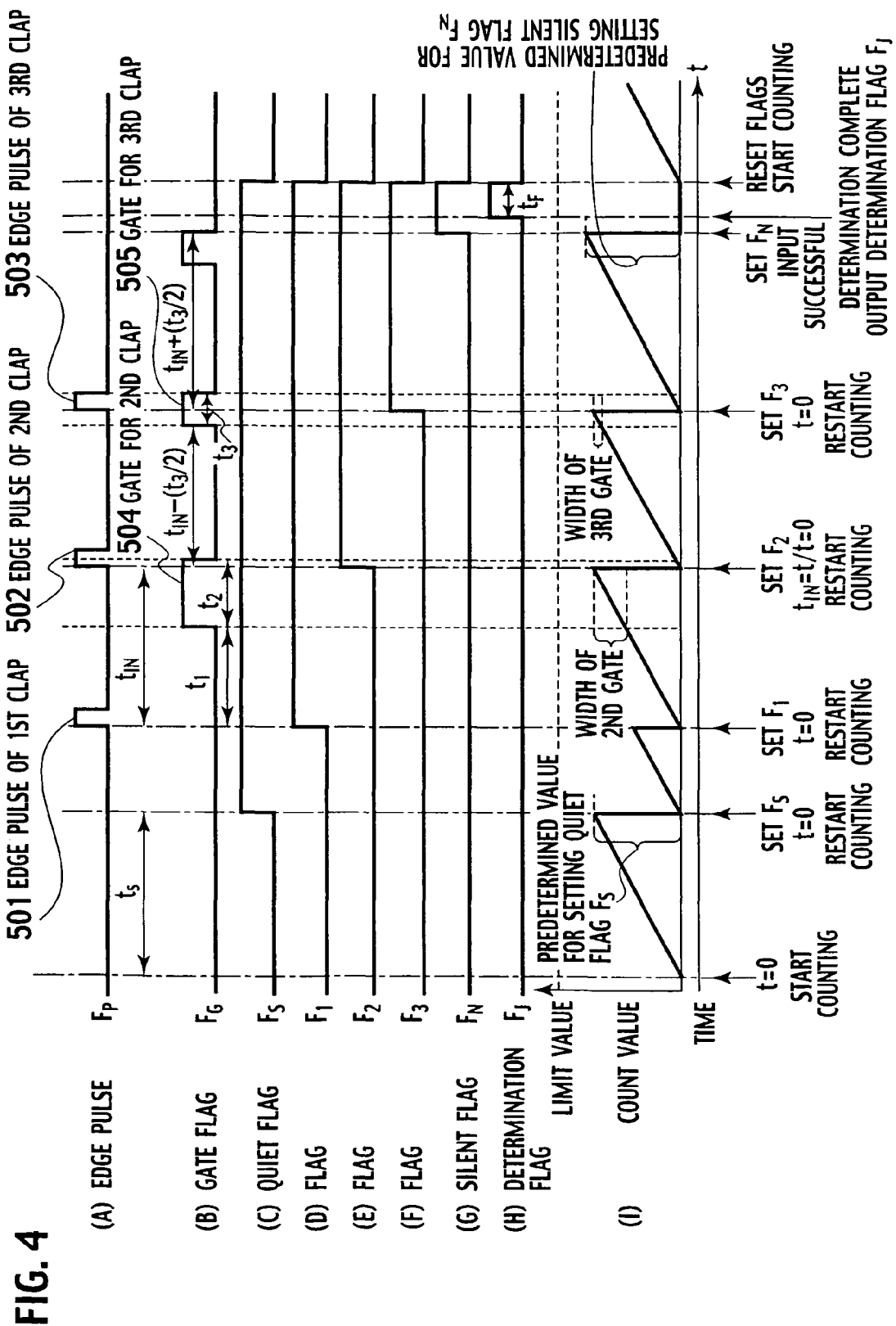
FIG. 4 is a timing chart explaining a determination algorithm of an ON/OFF mode according to the first embodiment.
Figure 5:
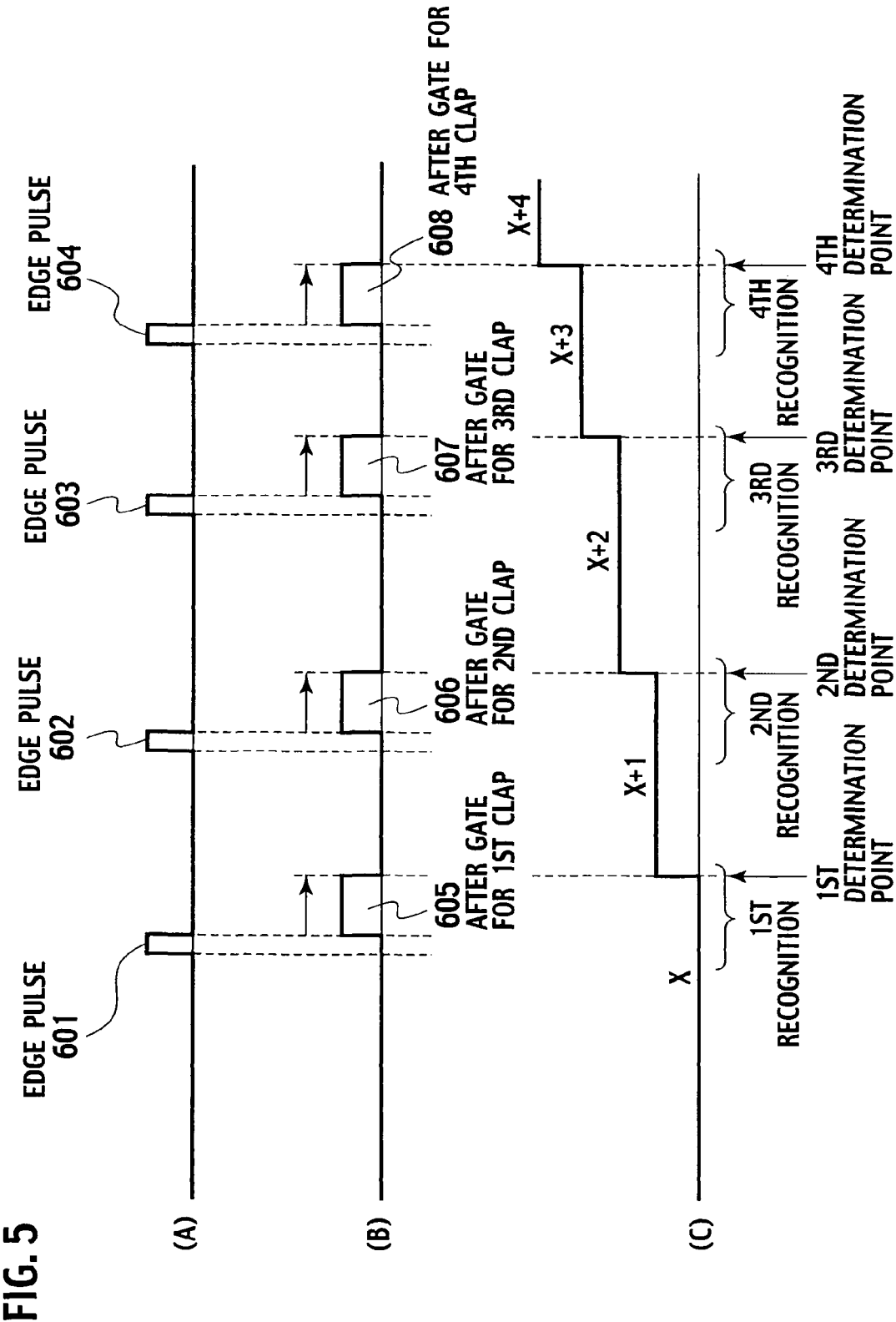
FIG. 5 is a timing chart showing a determination algorithm of a selective UP/DOWN mode according to the first embodiment.

FIG. 3 is a block diagram showing an example of the determination unit 109 and FIGS. 4 and 5 are timing charts explaining determination algorithms carried out by the determination unit 109.

As shown in FIG. 3, the determination unit 109 includes a determination processor 111 and a counter 110. The determination processor 111 receives the edge pulse FP, noisy state flag, and determination mode. The counter 110 generates a count value that is used to manage intervals of edge pulses supplied to the determination processor 111 and a time axis for generating a gate pulse to be used to gate a specific period of time.

According to the first embodiment, the algorithms employed by the determination processor 111 are switched from one to another according to a determination mode provided by the controller 120 to the determination processor 111. The first embodiment employs two determination modes. One is an ON/OFF mode that sets a quiet period before and after the user generates a predetermined number of claps, the quiet period being a period in which no clap nor noise similar to a clap is generated, and if the predetermined number of claps are recognized, outputs a determination signal. The other determination mode is a selective UP/DOWN mode that outputs a determination signal whenever a clap is recognized. According to the first embodiment, the predetermined number of claps is three or four.

FIG. 4 shows the ON/OFF mode to control the electronic appliance after recognizing three claps and FIG. 5 shows the selective UP/DOWN mode to control the electronic appliance after recognizing a clap.

The ON/OFF mode algorithm shown in FIG. 4 determines to control the electronic appliance if the predetermined number of claps are detected at regular intervals and if no clap is detected within a predetermined period before and after the detection of the predetermined number of claps. Namely, the determination processor 111 outputs a determination signal if a quiet flag $F_S$ shown in (C) of FIG. 4, flags $F_1$ to $F_3$ shown in (D) to (F) of FIG. 4, and a silent flag $F_N$ shown in (G) of FIG. 4 are all set. Employing all of the flags $F_S$, $F_1$ to $F_3$, and $F_N$ is most preferable for the first embodiment but it does not limit the present invention.

As mentioned above, the algorithm of FIG. 4 sets the predetermined number of claps as three. With reference to the timing chart of FIG. 4, operation of the determination processor 111 will be explained.

First, the determination processor 111 of the determination unit 109 determines whether or not the quiet flag $F_S$ shown in (C) of FIG. 4 is set. If the quiet flag $F_S$ is not set and if the edge pulse $F_P$ shown in (A) of FIG. 4 is low (0), the counter 110 starts to count "t." The count value t is incremented from the start value (t=0) as shown in (I) of FIG. 4. The determination processor 111 determines whether or not the edge pulse $F_P$ is continuously not set (logical 0) for a predetermined period $t_S$ counted by the counter 110, as shown in (A) of FIG. 4.

If the edge pulse $F_P$ is not set for the period $t_S$, the determination processor 111 determines that it is quiet and sets the quiet flag $F_S$ to logical 1 as shown in (C) of FIG. 4. At this time, the counter 110 is reset to "t=0" and a determination operation starts.

If the edge pulse $F_P$ is set during the period $t_S$ in which the quiet flag $F_S$ is not set, the counter 110 is reset to "t=0" and restarts to count. To prevent an overflow, the counter 110 is provided with a limit value as shown in (I) of FIG. 4.

When the quiet flag $F_S$ is set, the count value t of the counter 110 is again incremented from 0. At this time, the quiet flag $F_S$ is "1" and the first clap flag $F_1$ is "0" to wait for the edge pulse $F_P$ indicating a first clap.

When the edge pulse $F_P$ rises at 501 of (A) of FIG. 4 in response to the first clap, the determination processor 111 determines that the edge pulse $F_P$ is 1, sets the first clap flag $F_1$ to logical 1 as shown in (D) of FIG. 4, and determines that the first clap has been generated. When the edge pulse $F_P$ rises at 501, the counter 110 resets the count value t to 0 and restarts to count as shown in (I) of FIG. 4.

Thereafter, the quiet flag $F_S$ and first clap flag $F_1$ each are 1 and the second clap flag $F_2$ is 0 to wait for the edge pulse $F_P$ indicating a second clap. When the edge pulse $F_P$ rises at 502 of (A) of FIG. 4 in response to the second clap, the determination processor 111 determines that the edge pulse $F_P$ is 1 and checks to see if the count value t of the counter 110 at the rise 502 of the edge pulse $F_P$ satisfies "t≧$t_1$" and "t<$t_1$+$t_2$."

Namely, the determination processor 111 checks to see if the rise 502 of the edge pulse $F_P$ corresponding to the second clap is within a gate 504 (gate flag FG) that is for the second clap and has a time width $t_2$ as shown in (B) of FIG. 4. If the rise 502 of the edge pulse $F_P$ is within the gate 504, the determination processor 111 sets the second clap flag $F_2$ to logical 1 as shown in (E) of FIG. 4. The count value t of the counter 110 between the rise 501 of the edge pulse $F_P$ corresponding to the first clap and the rise 502 of the edge pulse $F_P$ corresponding to the second clap is stored as a first-to-second interval $t_{IN}$. Then, the counter 110 resets the count value t to 0 and restarts to count.

Thereafter, the quiet flag $F_S$ and first and second clap flags $F_1$ and $F_2$ each are 1 and the third clap flag $F_3$ is 0 to wait for the edge pulse $F_P$ indicating a third clap. When the edge pulse $F_P$ rises at 503 of (A) of FIG. 4 in response to the third clap, the determination processor 111 determines that the edge pulse $F_P$ is 1 and checks to see if the count value t of the counter 110 at the rise 503 of the edge pulse $F_P$ satisfies "$t \geq t_{IN} - (t_3/2)$" and "$t < t_{IN} + (t_3/2)$."

Namely, the determination processor 111 checks to see if the rise 503 of the edge pulse $F_P$ corresponding to the third clap is within a gate 505 (gate flag $F_G$) that is for the third clap and has a time width $t_3$ that is shorter than the time width $t_2$ as shown in (B) of FIG. 4. If the rise 503 of the edge pulse $F_P$ is within the gate 505, the determination processor 111 sets the third clap flag $F_3$ to logical 1 as shown in (F) of FIG. 4. Then, the counter 110 resets the count value t to 0 and restarts to count. The gate 505 for the third clap is set to rise when a period of "$t_{IN} - (t_3/2)$" passes after the rise 502 of the edge pulse $F_P$ corresponding to the second clap.

The quiet flag $F_S$ and clap flags $F_1$, $F_2$, and $F_3$ each are logical 1 and a fourth clap flag $F_4$ (not shown) is 0. In this state, the count value t is incremented. If the edge pulse $F_P$ is not set and keeps the low level until a condition of "$t \geq t_{IN} + (t_3/2)$" is satisfied, the determination processor 111 sets the silent flag $F_N$ to logical 1 as shown in (G) of FIG. 4.

By setting the silent flag $F_N$, the determination processor 111 determines that no sound wave has been received by the microphone 101.

All of the quiet flag $F_S$, clap flags $F_1$ to $F_3$, and silent flag $F_N$ are set, and the determination processor 111 outputs a determination flag (determination signal) $F_J$ for a predetermined period $t_F$ as shown in (H) of FIG. 4. Namely, it is determined that claps for carrying out a control operation have correctly been received and that the determination operation has completed. After the period $t_F$, the determination unit 109 resets all of the flags and count value to 0. The counter 110 restarts to count for preparation of the next determination operation.

In this way, the determination unit 109 carries out the determination operation of ON/OFF mode.

The first embodiment employs the quiet flag $F_S$ and silent flag $F_N$ in addition to a predetermined number of clap flags as determination conditions. Due to this, the user can provide the predetermined number of claps, to carry out the predetermined number plus two of determinations. This is preferable because the number of claps made by the user is suppressed and the determination unit 109 can correctly carry out the determination operation without errors. Also, resistance to environmental noise improves.

If the rise 502 of the edge pulse $F_P$ corresponding to the second clap does not occur for a period of "$t_1 + t_2$," the determination unit 109 determines that it is an input failure and resets the quiet flag $F_S$, interval $t_{IN}$, and first clap flag $F_1$.

Similarly, if the rise 503 of the edge pulse $F_P$ corresponding to the third clap does not occur for a period of "$t_{IN} + (t_3/2)$," the determination unit 109 determines that it is an input failure and resets the quiet flag $F_S$, interval $t_{IN}$, and first and second clap flags $F_1$ and $F_2$.

If the edge pulse $F_P$ rises after setting the third clap flag $F_3$ and before passing the period of "$t_{IN} + (t_3/2)$," the determination unit 109 determines that it is an input failure because the number of claps is greater than the predetermined number of three.

The first embodiment uses the interval $t_{IN}$ between the first rise 501 of the edge pulse $F_P$ corresponding to the first clap and the second rise 502 of the edge pulse $F_P$ corresponding to the second clap, to generate the gate 505 for the third clap. Using the interval $t_{IN}$ for generating gates for the third and following claps equalizes the intervals of adjacent gates (gate flag $F_G$) used to detect the third and following claps.

The first embodiment makes the time width $t_2$ of the gate 504 for the second clap relatively long to cope with the user's pace of making claps that may vary.

Although the example shown in FIG. 4 controls the electronic appliance in response to three claps, this does not limit the present invention. The larger the number of claps, the stricter the determination condition becomes to improve resistance to errors. The number of claps, however, must not be too large because many claps are laborious for the user to make and lead to errors. Accordingly, three or four claps may be appropriate for controlling the electronic appliance.

Although not shown in FIG. 4, the number of claps to control the electronic appliance may be four or larger. In this case, the "n"th clap (n is an integer equal to or larger than 4) is detected with the "m"th gate (m is an integer equal to or larger than 3 and smaller than n by 1). The "m"th gate may be made like the gate 505 for the third clap. A gate-to-gate interval between the gate 505 for the third clap and the next gate is determined by subtracting ½ of the time width $t_3$ of the gate 505 for the third clap from the interval $t_{IN}$. Namely, a gate-to-gate interval between the "m"th gate for the "n"th clap and the adjacent gate is determined by subtracting ½ of the time width $t_3$ of the gate 505 for the third clap from the interval $t_{IN}$.

Alternatively, the gate 505 for the third clap is formed from the interval $t_{IN}$ between the first and second claps as mentioned above, and the gate for the fourth clap is formed from an interval $t_{IN}'$ between the second and third claps. In this way, the "m"th gate (m is an integer equal to or larger than 3 and smaller than n by 1) for the "n"th clap (n is an integer equal to or larger than 4) is formed from an interval between the "n−2"th clap and the "n−1"th clap. This technique can cope with claps that gradually change their intervals within an allowable range of gate flag width.

As mentioned above, there are two techniques for creating a gate for detecting a clap. Generally, it is difficult for the user to generate claps at perfectly regular intervals. Pace of claps provided by the user gradually becomes faster or slower. Accordingly, the latter technique of varying intervals is preferable.

Next, the selective UP/DOWN mode will be explained. The selective UP/DOWN mode is used when the user controls the electronic appliance by selecting graphical menu images.

FIG. 5 is a timing chart explaining an algorithm for the selective UP/DOWN mode. In the selective UP/DOWN mode, the determination unit 109 completes a determination operation every time when an edge pulse is generated according to a clap and outputs a determination signal (corresponding to the determination flag $F_J$ of FIG. 4).

In FIG. 5, (A) shows edge pulses $F_P$ sequentially generated by the edge pulse generator 108. In this example, four edge pulses 601 to 604 are detected in response to four claps. Namely, a detection signal is generated four times, to carry out four control operations with respect to the electronic appliance.

In FIG. 5, (B) shows after gates each generated by the determination processor 111 just after the generation of an edge pulse. Namely, just after the first edge pulse 601 is generated in response to a first clap, a first after gate 605 is generated. Similarly, just after the second, third, and fourth edge pulses 602, 603, and 604 are generated, second, third, and fourth after gates 606, 607, and 608 are generated, respectively.

The after gates 605 to 608 each are a gate to confirm that no edge pulse is generated within the gate after an edge pulse is generated before the gate in response to a clap. The period of each of the after gate 605 to 608 is shorter than an interval between the adjacent claps when a single user continuously generates claps. The after gate is provided to avoid an erroneous recognition that may be caused when a plurality of persons make claps or when an unintended clap-like sound happens. Protection by the after gates shown in (B) of FIG. 5 is not always necessary but it is preferable because it improves resistance to recognition errors.

In FIG. 5, (C) shows that the determination processor 111 outputs a determination signal indicative of edge pulse detection and that the controller 120 receives the determination signal and increments a specific value. When the first edge pulse 601 falls, the first after gate 605 is generated as shown in (B) of FIG. 5. If it is confirmed at a first determination point that no edge pulse has occurred within the gate 605, the determination processor 111 outputs a determination signal. In response to the determination signal, the controller 120 increments the specific value to control the electronic appliance.

At each of second, third, and fourth determination points, the determination processor 111 outputs a determination signal to control the electronic appliance.

Compared with the ON/OFF mode, the selective UP/DOWN mode involves a simpler algorithm from detecting a clap to outputting a determination signal, and therefore, is less resistive to recognition errors. However, the determination processor 111 recognizes a clap in the selective UP/DOWN mode only during a limited period in which a menu image is displayed. In addition, the user can correct his or her operation with the use of menu images, and therefore, the low resistance to recognition errors is acceptable in practice. When combined with graphical menu images, the selective UP/DOWN mode is effective to diversify clap recognition.

Figure 6:
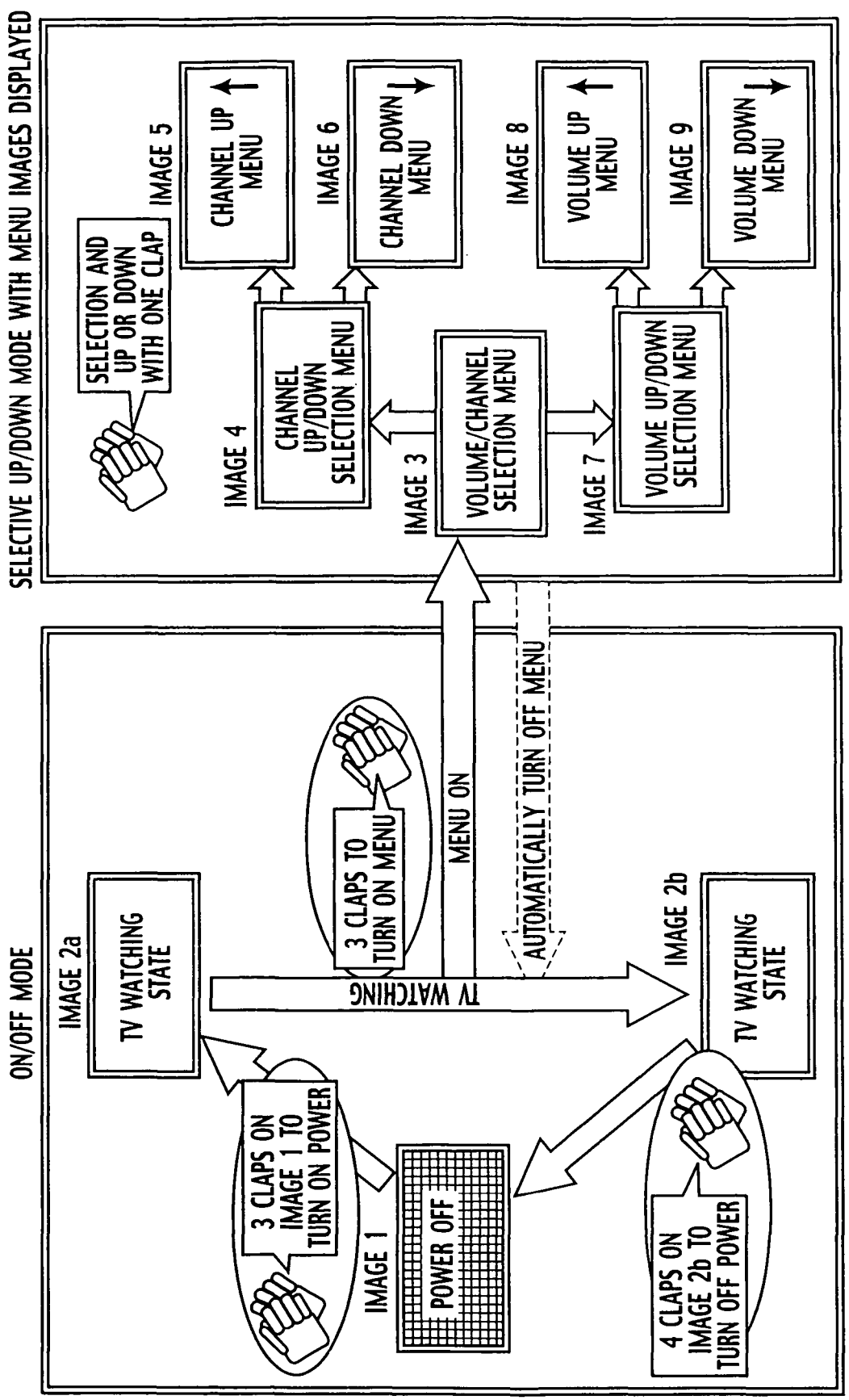
FIG. 6 is a view showing examples of images to be displayed on a display according to the first embodiment.

FIG. 6 shows examples of images 1 to 9 that are selectively displayed by the controller 120 according to an edge pulse determination made by the determination unit 109 in a given determination mode. A left part of FIG. 6 encircled with a double line corresponds to the ON/OFF mode of edge pulse determination.

A right part of FIG. 6 encircled with a double line corresponds to the selective UP/DOWN mode of edge pulse determination. Images 3 to 9 are associated with control operations of the electronic appliance, respectively. Each of the images 3 to 9 is a menu image showing control operations to be carried out by the controller 120 with respect to the electronic appliance when the menu image is displayed.

As shown in FIG. 6, the controller 120 in the ON/OFF mode turns on the electronic appliance (television set) when receiving a determination signal indicating that three claps have been detected. A power source circuit of the electronic appliance is not shown in FIG. 1. The controller 120 turns off the electronic appliance when receiving a determination signal indicating that four claps have been detected. In these occasions, the controller 120 functions as a power source controller. If the electronic appliance is ON and if the controller 120 receives a determination signal indicating that three claps have been detected, the controller 120 displays a menu image on the display. At this time, the controller 120 functions as a display controller.

If the electronic appliance is OFF, the display displays nothing. This corresponds to the image 1 shown in FIG. 6. If the edge pulse generator 108 generates three edge pulses in response to three claps, the determination unit 109 outputs a determination signal accordingly. In response to the determination signal, the controller 120 turns on the electronic appliance and displays the image 2a. The image 2a may be an image of television broadcasting or an image from a package medium and is watched by the user.

If three edge pulses are generated while the image 2a is being displayed, the controller 120 displays, for example, the image 3. The image 3 is a menu image that allows the user to, for example, change the sound volume or channel of the television set. The menu image 3 (any one of the images 4 to 9 as well) is superimposed on the image 2a watched by the user.

When displaying the menu image 3, the controller 120 according to the first embodiment switches the ON/OFF mode to the selective UP/DOWN mode.

When the menu image 3 is displayed, the user can select one of controlling the sound volume of the television set and controlling the channel thereof by making a clap. If the user selects controlling the sound volume (the details of this will be explained later), the controller 120 displays the image 7.

The image 7 is a volume up/down selection menu with which the user can select one of increasing the sound volume and decreasing the sound volume by making a clap. If the user selects increasing the sound volume, the controller 120 displays the image 8.

In the image 8, the number of edge pulses detected by the determination unit 109 in response to claps corresponds to a quantity by which the sound volume is increased by the controller 120. Namely, the user may continuously make claps until a desired sound volume is obtained. As shown in (C) of FIG. 5, the controller 120 increments an initial value X according to the number of claps, thereby increasing the sound volume of the electronic appliance.

If the controller 120 determines that controlling the channel of the electronic appliance is selected in the menu image 3, the controller 120 displays the image 4. The image 4 is a channel up/down selection menu and is similar to the image 7 that is a volume up/down selection menu. With the menu image 4, the user can select one of turning up the channel and turning down the channel.

While one of the channel up menu image 5, channel down menu image 6, volume up menu image 8, and volume down menu image 9 is being displayed, the controller 120 checks to see if a predetermined time has passed after the up/down control operation. If the predetermined time has passed, the controller 120 stops displaying the menu image that is being displayed. Namely, the display returns to a normal watching state of the television set, i.e., a watching state of the image 2b. Here, the image 2b is a time-elapsed image of the image 2a and neither of the images 2a and 2b has superimposition of a menu image.

The controller 120 may stop displaying the menu images when the determination unit 109 detects four edge pulses in response to four claps. If the controller 120 receives a determination signal indicating that four edge pulses have been detected while the image 2b is being displayed, the controller turns off the television set.

In this way, the controller 120 carries out control operations of turning on/off the electronic appliance (television set), turning up/down the channel of the appliance, and increasing/decreasing the sound volume of the appliance. These are mainly and frequently conducted operations among many control operations of the television set. The first embodiment allows the user to achieve these control operations without an existing remote controller.

Switching the images shown in FIG. 6 from one to another on the display according to claps will be explained in detail with reference to FIGS. 7 to 11.

Figure 7:
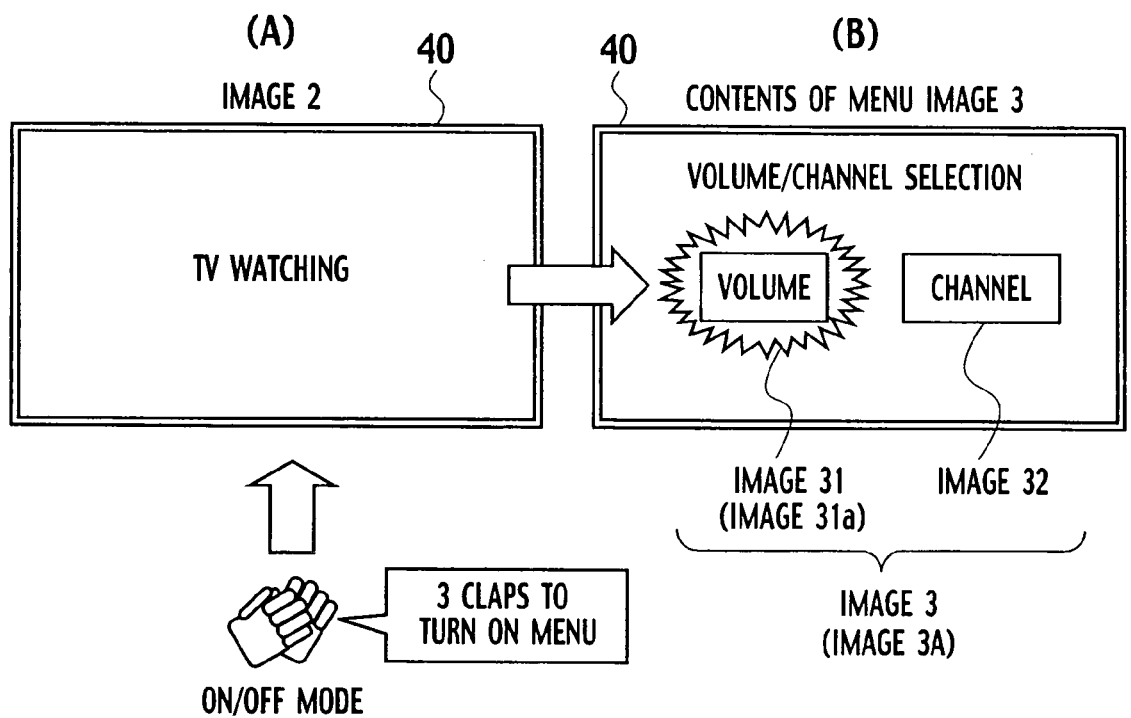
FIG. 7 shows an operation of displaying a menu image on the display according to the first embodiment.

In FIG. 7, the image 2 (2a or 2b) is displayed on the display 40 of the electronic appliance (television set), three claps are made and detected, and the menu image 3 is displayed in response to the detected claps. Namely, (A) of FIG. 7 shows the image 2 presently displayed on the display 40. At this time, the user makes three claps. In response to the claps, edge pulses are generated, and accordingly, the determination processor 111 outputs a determination signal indicating that the three edge pulses have been detected. According to the determination signal, the controller 120 displays the volume/channel selection menu image 3 on the display 40 as shown in (B) of FIG. 7. At the same time, the controller 120 switches the mode of the determination unit 109 from the ON/OFF mode to the selective UP/DOWN mode, so that the determination processor 111 outputs a determination signal whenever detecting one edge pulse in response to a clap. According to the determination signal, the controller 120 carries out a proper control operation with respect to the electronic appliance (television set).

The menu image 3 shown in (B) of FIG. 7 is generated by a graphics generator to be explained later. Any menu image displayed on the display 40 presents the user with a plurality of control operations the user can conduct with respect to the electronic appliance. According to the example shown in (B) of FIG. 7, the menu image 3 presents the user with a volume button 31 and a channel button 32. Namely, the menu image 3 indicates that the user can control the sound volume or channel of the electronic appliance.

Only displaying a menu image containing a plurality of control operations is not sufficient to allow the user to select a desired control operation with claps as a trigger. For this, the controller 120 according to the first embodiment alternately activates and displays the control operations, so that the controller 120 can execute the active control operation in response to an edge pulse provided by the determination unit 109 based on a clap. In FIG. 8, the controller 120 alternately displays on the display 40 an image 3A in which the volume control is active and an image 3B in which the channel control is active at regular intervals.

Through the drawings, a control button image encircled with a serrated line in a given menu image corresponds to a control operation that is active. In (A) of FIG. 8, the menu image 3A includes a volume button 31a that is active and the channel button 32 that is inactive. Namely, the menu image 3A includes the active volume button 31a and inactive channel button 32. In (B) of FIG. 8, the menu image 3B includes the volume button 31 that is inactive and a channel button 32a that is active. Namely, the menu image 3B includes the inactive volume button 31 and the active channel button 32a.

There are various ways to show the user which one is active among a plurality of control operations. For example, an active control button can be surrounded with a circle, or it can be displayed with a brightness, color, shape, or size that is different from that of an inactive control button. For example, an active control button may be displayed brighter and an inactive control button grayed. According to the first embodiment, a menu image displayed on the display 40 includes two button images in which one is active and the other is inactive. Instead, the menu image on the display 40 may include only the active one.

The controller 120 alternately activates a plurality of control operations of the electronic appliance at regular intervals. In synchronization with this, the controller 120 alternately displays on the display 40 a plurality of images associated with the control operations with an image representative of the presently activated control operation being displayed in an active state. In this case, the controller 120 functions as a display controller for controlling the display 40.

According to the first embodiment, the controller 120 alternately activates control operations at predetermined intervals, for example, every second. In synchronization with this, the controller 120 alternately displays the images corresponding to the control operations on the display 40 at the predetermined intervals. More precisely, in FIG. 8, the controller 120 alternately activates the volume button 31a and the channel button 32a at intervals of one second. Namely, the controller 120 alternately displays the images 3A and 3B on the display 40 at intervals of one second. In this way, the controller 120 according to the first embodiment alternately displays images on the display 40 according to alternately activated control operations. This allows the user who is watching the display 40 to select a desired control operation by making a clap at the timing when the desired control operation is active on the display 40.

According to the first embodiment, the controller 120 alternately activates two control operations. This does not limit the present invention. For example, it is possible to activate three or more control operations one after another. In this case, three or more images corresponding to the three or more control operations are displayed on the display 40 one after another.

According to the example shown in FIG. 8, the edge pulse generator 108 generates one edge pulse when the active volume button 31a is displayed on the display 40, i.e., when the sound volume control is active. When receiving a determination signal from the determination unit 109, the controller 120 determines that the sound volume control has been selected and establishes a sound volume control state. At this time, the menu image 3A shown in (A) of FIG. 9 (equal to the menu image 3A shown in (A) of FIG. 8) is changed to the image 7 shown in (B) of FIG. 9.

Figure 9:
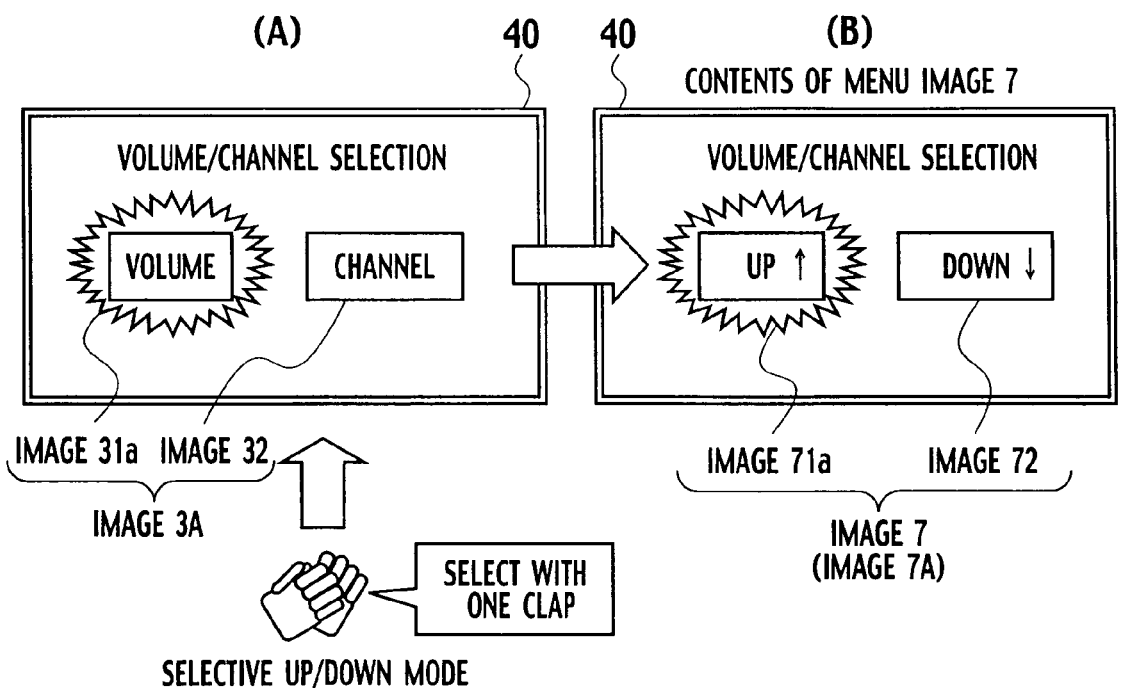
FIG. 9 explains transition from the menu image 3A to a menu image 7 according to the first embodiment.

The menu image 7 (7A) shown in (B) of FIG. 9 includes an up button 71 (71a) for increasing sound volume and a down button 72 for decreasing sound volume. With this, the user can select one of increasing and decreasing the sound volume of the electronic appliance (television set).

Figure 10:
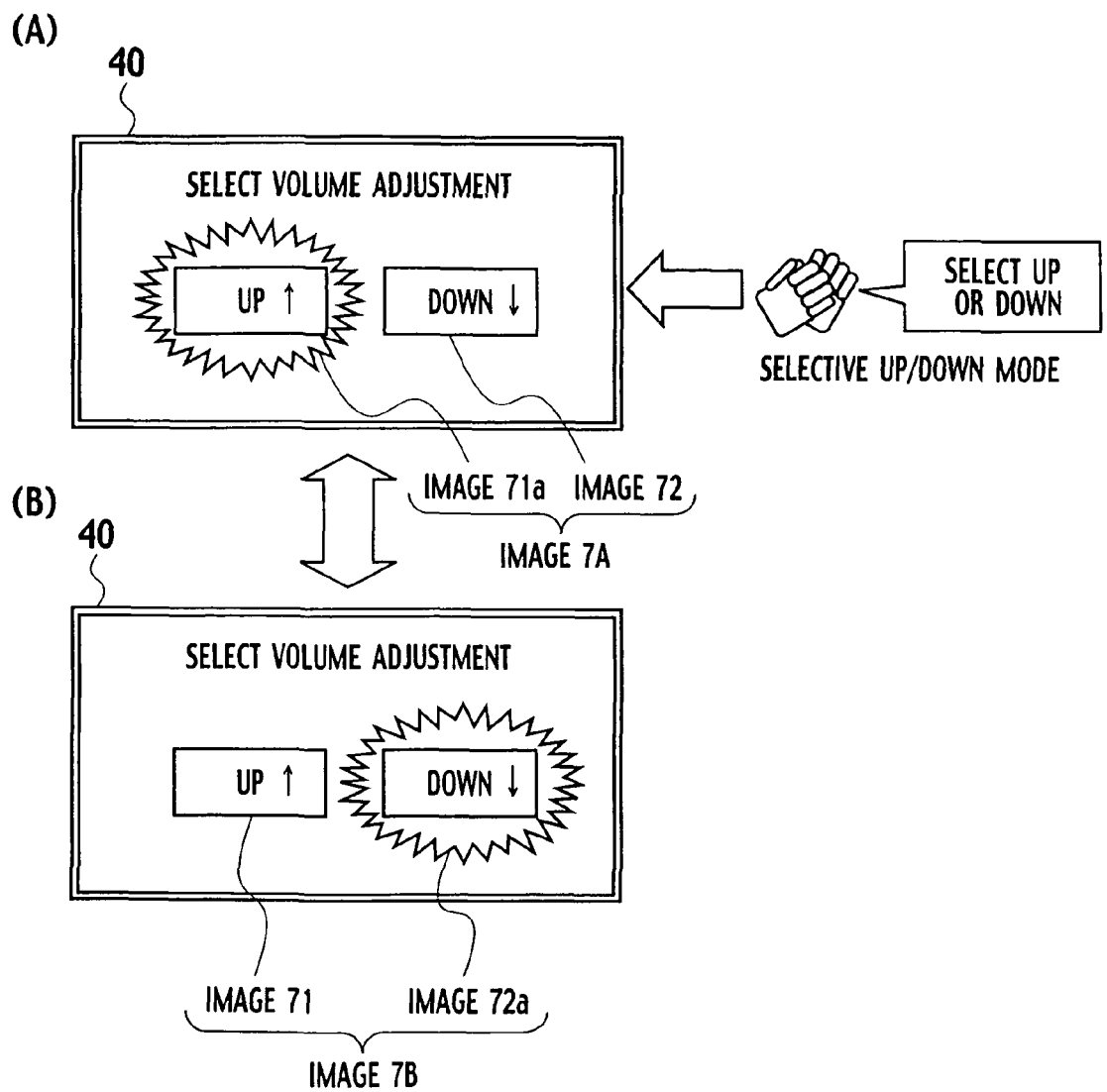
FIG. 10 shows menu images 7A and 7B toggled according to the first embodiment.

Shown in (A) of FIG. 10 is the image 7A which is also shown in (B) of FIG. 9 and in which the sound volume increasing control is active. The image 7A includes an active up button 71a and an inactive down button 72. Shown in (B) of FIG. 10 is an image 7B showing that the sound volume decreasing control is active. The image 7B includes an inactive up button 71 and an active down button 72a. As explained above, the controller 120 alternately activates the up control and down control at intervals of one second. Consequently, the images 7A and 7B are alternately displayed on the display 40 at intervals of one second.

In FIG. 10, a clap is generated when the image 7A with the active up button 71a is displayed on the display 40. In response to the clap, the edge pulse generator 108 generates one edge pulse. The determination unit 109 outputs a determination signal according to the edge pulse. The controller 120 receives the determination signal in the state in which the sound volume increasing control is active. In response to the determination signal, the controller 120 determines that the sound volume increasing control has been selected and temporarily stops alternating the active states. Since the controller 120 receives the determination signal when the sound volume increasing control is active, the controller 120 stops alternately activating the sound volume increasing and decreasing control states and keeps the sound volume increasing control active.

Namely, the controller 120 maintains the selected control operation in an active state. At the same time, the controller 120 stops alternating the menu images.

Figure 11:
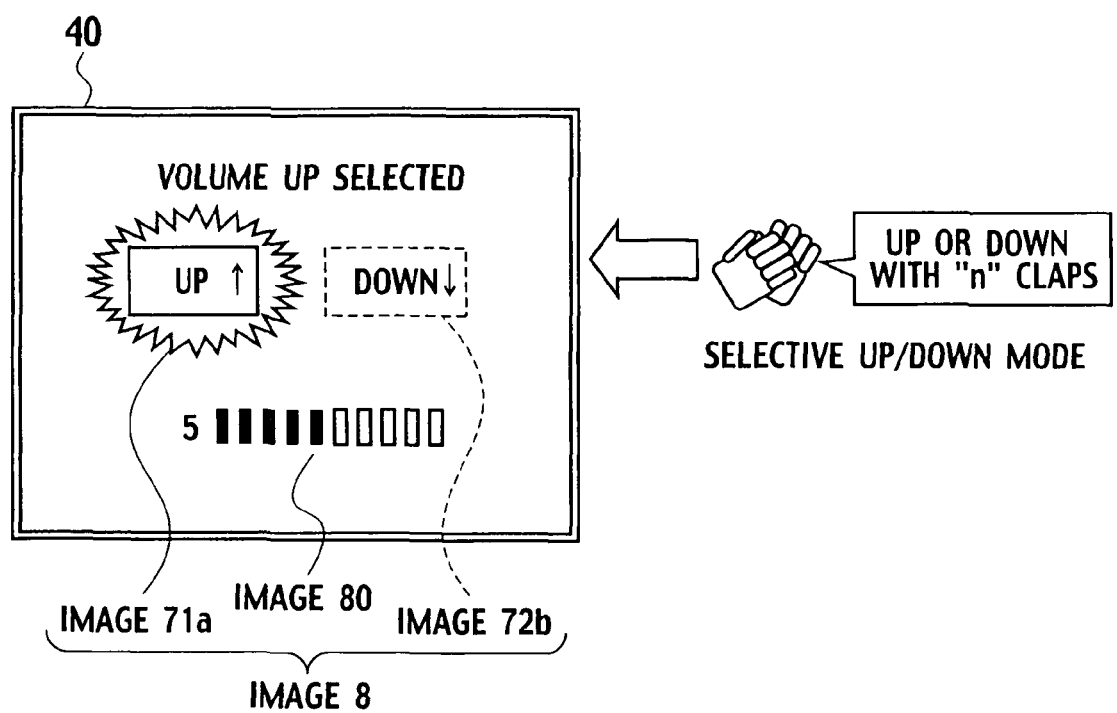
FIG. 11 shows a menu image 8 that is not toggled according to the first embodiment.

Thereafter, the controller 120 displays the image 8 shown in FIG. 11 on the display 40. The image 8 contains the up button 71 (71*a*), the down button 72 (72*b*), and a volume indicator 80.

At this moment, the controller 120 is ready to execute the sound volume increasing control, keeps the sound volume increasing control active, and continuously displays on the display 40 the image 8 indicating that the sound volume increasing control is active. The controller 120 stops switching the image 8 to another. The image 8 contains the active up button 71*a* and inactive down button 72*b*. The inactive down button 72*b* is displayed with a lower brightness than the inactive down button 72 shown in (A) of FIG. 10.

To clearly indicate that the active state has been fixed, the display may display only the active button.

The volume indicator 80 representative of a sound volume level is a bar consisting of a plurality of rectangles. The number of the rectangles corresponds to a variable range of sound volume. According to the first embodiment, an initial level of the sound volume is 5, and therefore, five of the rectangles are blackened.

If the controller 120 receives from the determination unit 109 a determination signal indicating one edge pulse has been detected while the image 8 is being displayed on the display 40, the controller 120 increases the sound volume of the electronic appliance by one level. If "n" edge pulses are detected, the controller 120 increases the sound volume from level 5 to level 5+n. When the sound volume is increased, the black rectangles in the volume indicator 80 are increased accordingly.

If the controller 120 determines that the sound volume decreasing control has been selected in (B) of FIG. 10, the sound volume is decreased from the initial level according to the number of detected claps, similar to the example of FIG. 11. If the channel up/down control is selected in FIG. 8, a control operation of turning up or down the channel of the electronic appliance is carried out similar to the sound volume up/down operation.

In this way, the controller 120 controls the electronic appliance according to one or a plurality of edge pulses corresponding to claps and an active-state image displayed on the display 40. For example, the controller 120 increases/decreases the sound volume of the electronic appliance, or turns up/down the channel of the electronic appliance in response to claps made by the user. In this case, the controller 120 functions as an operation controller.

A method of controlling the electronic appliance according to the first embodiment of the present invention will be explained with reference to a flowchart shown in FIG. 12. The controller 120 executes steps shown in the flowchart to control the electronic appliance.

In an initial state of the controller 120, a flag Fmd indicating a determination mode employed by the determination unit 109 is "0" representing the ON/OFF mode, a flag F of indicating a power state is "0" representing a power OFF state, and a flag Fmn indicating whether or not a menu image is displayed on the display 40 is "0" representing no menu image displayed on the display 40. The power OFF state is a state in which no power is supplied to every part of the electronic appliance except the part to detect claps according to the present invention.

In step S1, the controller 120 checks to see if power must be turned on. At this moment, the electronic appliance (television set) is in an OFF state. If three claps are generated to turn on the electronic appliance, the controller 120 receives from the determination unit 109 a determination signal indicating that three edge pulses corresponding to the three claps have been detected and sets the flag F of to 1. Then, in step S2, the controller 120 turns on the electronic appliance.

If three claps are not detected, the controller 120 keeps the power OFF state.

When the electronic appliance is turned on in step S2, a television program (image 2*a*) is displayed on the display 40 as shown in FIG. 6, to set up a watching state. In step S3, the controller 120 checks to see if power must be turned off. In step S5, the controller 120 checks to see if a menu image must be displayed.

If four claps are generated in the watching state, the determination unit 109 outputs a determination signal indicating that four edge pulses corresponding to the four claps have been detected. In step S3, the controller 120 receives the determination signal and sets the flag Fof to 0, and in step S4, the controller 120 turns off the electronic appliance. At this time, the display 40 is turned off to the power OFF image 1 shown in FIG. 6. If the predetermined number of edge pulses are not detected in step S3, the watching state is maintained.

If receiving, in step S5, from the determination unit 109 a determination signal indicating that edge pulses corresponding to three claps have been detected, the controller 120 sets the menu flag Fmn to 1 to indicate a menu image displaying state. If three claps are not detected in step S5, the watching state is maintained.

If the menu flag Fmn is 1, the controller 120 displays a menu image on the display 40, and if the menu flag Fmn is 0, the controller 120 displays no menu image on the display 40 or erases a menu image from the display 40. When the flag Fmn is changed from 1 to 0, the controller 120 stops displaying menu images on the display 40.

In step S6, the controller 120 sets the determination mode flag Fmd to 1 to establish the selective UP/DOWN mode for the determination unit 109.

From step S1 to step S5, the menu flag Fmn is 0 to display no menu image on the display 40 of the electronic appliance. With the mode flag Fmd of 0, the determination unit 109 processes edge pulses in the ON/OFF mode.

From step S6 to step S16 and from step S21 to step S32, the menu flag Fmn and mode flag Fmd each are 1 so that the display 40 displays menu images and the determination unit 109 operates in the selective UP/DOWN mode to output a determination signal whenever detecting an edge pulse.

In step S7, the controller 120 alternates the value of a first active flag Fg1 between 0 and 1 at predetermined intervals. If the first active flag Fg1 is 0, the channel control is active, and if it is 1, the sound volume control is active. In synchronization with the alternation of the first active flag Fg1, the menu images shown in (A) and (B) of FIG. 8 are alternately displayed on the display 40 at the predetermined intervals. When the first active flag Fg1 is 0, the menu image 3B containing the active channel button 32*a* is displayed on the display 40, and when the flag Fg1 is 1, the menu image 3A containing the active volume button 31*a* is displayed on the display 40.

In step S8, the controller 120 checks to see if an edge pulse has been generated when the first active flag Fg1 is 0 or 1.

Namely, the controller 120 determines whether or not a clap has been generated at the timing when the active channel button 32a or the active volume button 31a is displayed. As mentioned above, the first active flag Fg1 is alternated between 0 and 1 at the predetermined intervals until an edge pulse is generated. Namely, the alternation of the first active flag Fg1 loops.

If a clap is detected with the first active flag Fg1 being 0, the controller 120 sets a selection flag Fs1 to 0 indicating the channel control and advances to step S23. In step S23, the channel selection menu image 4 shown in FIG. 6 is displayed on the display 40 and the controller 120 toggles a second active flag Fg2 between 0 and 1. If the second active flag Fg2 is 1, the channel turning up control is active, and therefore, an active up button is displayed on the display 40. If the second active flag Fg2 is 0, the channel turning down control is active, and therefore, an active down button is displayed on the display 40.

In step S8, if one edge pulse is generated with the first active flag Fg1 being 1, the controller 120 sets the selection flag Fs1 to 1 indicating the sound volume control and advances to step S9. In step S9, the sound volume up/down selection menu image 7 shown in FIG. 6 is displayed on the display 40 and the controller 120 toggles the second active flag Fg2 between 0 and 1 at predetermined intervals. If the second active flag Fg2 is 1, the menu image 7A with the active up button 71a shown in (A) of FIG. 10 is displayed on the display 40. If the second active flag Fg2 is 0, the menu image 7B with the active down button 72a shown in (B) of FIG. 10 is displayed on the display 40.

In step S10, the controller 120 checks to see if one edge pulse is generated when the second active flag Fg2 is 0 or 1.

In step S10, if one edge pulse is generated when the second active flag Fg2 is 1 (up), the controller 120 sets an up/down flag Fs2 to 1 and advances to step S11. In step S11, the menu image 8 is displayed on the display 40, to show that the sound volume increasing control is kept active. In step S12, the controller 120 determines whether or not a determination signal indicating that an edge pulse has been detected is received from the determination unit 109. If the determination signal is received, the controller 120 increases the sound volume of the electronic appliance by one level in step S13.

If, in step S10, an edge pulse is generated when the second active flag Fg2 is 0 (down), the controller 120 sets the up/down flag Fs2 to 0 and advances to step S14. In step S14, a menu image showing that the sound volume decreasing control is kept active is displayed on the display 40. In step S15, the controller 120 determines whether or not a determination signal is received, and in step S16, decreases the sound volume of the electronic appliance by one level.

If no determination signal is received in step S12 or S15, the controller 120 advances to step S21.

When the sound volume adjusting control completes in step S13 or S16, the controller 120 advances to step S21 and starts to count time with a first counter 1. The count value C1 of the first counter 1 is reset whenever an edge pulse is generated, i.e., whenever the sound volume is adjusted by one level. In step S22, the controller 120 determines whether or not the count value C1 of the first counter 1 satisfies a condition of "C1>th1" where th1 is a threshold. Namely, step S22 checks to see if no edge pulse is generated within the predetermined period th1. The threshold th1 corresponds to a first arrow shown in FIG. 13.

If the above-mentioned condition is satisfied, the controller 120 returns to step S9 to alternately activate the up/down selection. At this time, the menu image 7A with the active up button 71a and the menu image 7B with the active down button 72a are alternately displayed on the display 40 as shown in FIG. 10. Returning to step S9 allows the user to again select the sound volume up/down control and correct the sound volume of the electronic appliance.

If, in step S22, the condition of "C1>th1" is not satisfied, the controller 120 loops step S22.

When the sound volume increasing control and the sound volume decreasing control are alternately activated in step S9, the controller 120 counts time with a second counter 2 in step S17. The count value C2 of the second counter 2 is reset when an edge pulse is generated, i.e., when the up or down control is selected. In step S18, the controller 120 determines whether or not the count value C2 of the second counter 2 satisfies a condition of "C2>th2" where th2 is a threshold. Namely, the controller 120 checks in step S18 to see if no edge pulse is generated within the predetermined period th2. The threshold th2 corresponds to a second arrow shown in FIG. 13 and is longer than a period in which each menu image concerned is once activated. If the condition is met, the controller 120 advances to step S19.

If, in step S18, the condition of "C2>th2" is not met, the controller 120 loops step S18.

In step S19, the controller 120 sets the determination mode flag Fmd to 0 to put the determination unit 109 in the ON/OFF mode. In step S20, the controller 120 sets the menu flag Fmn to 0 to clear the menu image from the display 40. Thereafter, the controller 120 returns to the watching state of steps S3 and S5.

The channel up/down control in steps S23 to S32 is carried out similar to the sound volume up/down control explained above.

Figure 13:
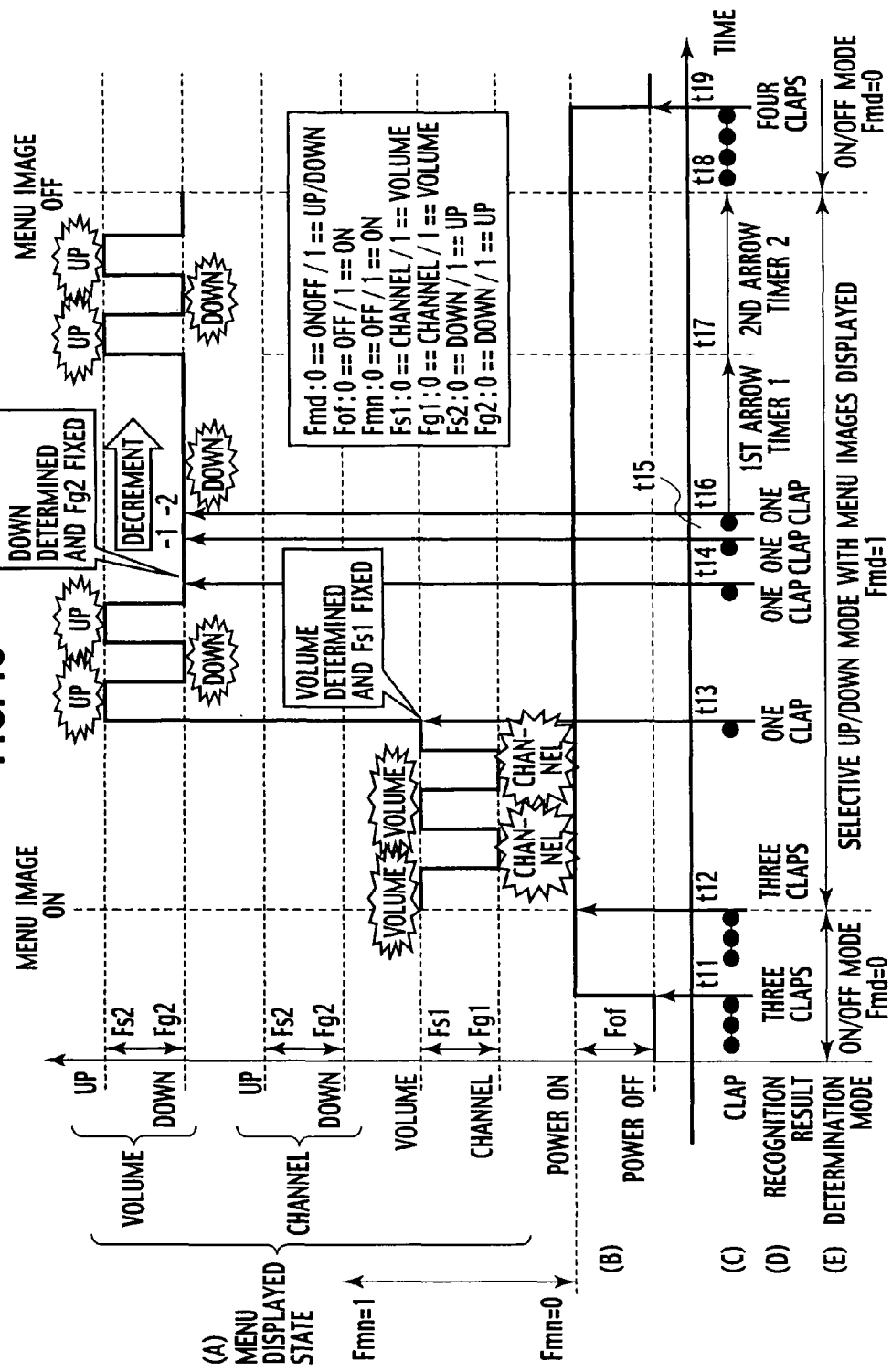
FIG. 13 is a timing chart explaining the controlling method of FIG. 12 according to the first embodiment.

FIG. 13 is a timing chart explaining the controlling method according to the first embodiment of the present invention. This timing chart shows examples of state transition of the electronic appliance and menu images displayed according to claps made by the user. In FIG. 13, a time axis extends in a horizontal direction. In FIG. 13, (E) indicates the determination modes with arrows extending along the time axis, (C) indicates user's claps with black circles, and (D) indicates determination (recognition result) of detected edge pulses based on the claps (C).

As explained above, the controller 120 turns on power when receiving a determination signal indicating that three edge pulses have been detected in the ON/OFF mode. When receiving a determination signal indicating that four edge pulses have been detected, the controller 120 turns off power. When power is ON, the controller 120 displays a menu image in response to a determination signal indicating that three edge pulses have been detected.

In the selective UP/DOWN mode, the controller 120 receives a determination signal whenever the determination unit 109 detects one edge pulse and conducts a control operation associated with a menu image displayed on the display 40 at this moment. In FIG. 13, t11 to t19 are time points depicted along the time axis.

As shown in (B) of FIG. 13, power is initially OFF. The user makes three claps as shown in (C) of FIG. 13. At t11, the controller 120 receives a determination signal indicating that three edge pulses have been detected and turns on the electronic appliance (television set) as shown in (B) of FIG. 13 to display, for example, a broadcasting program image on the display 40 and establish a watching state (steps S1 and S2 of FIG. 12).

Decreasing the sound volume of the electronic appliance will be explained. The user applies three claps. Based on edge pulses generated in response to the claps, the controller 120 displays at t12 the menu image 3 of FIG. 6 on the display 40

Figure 12A:
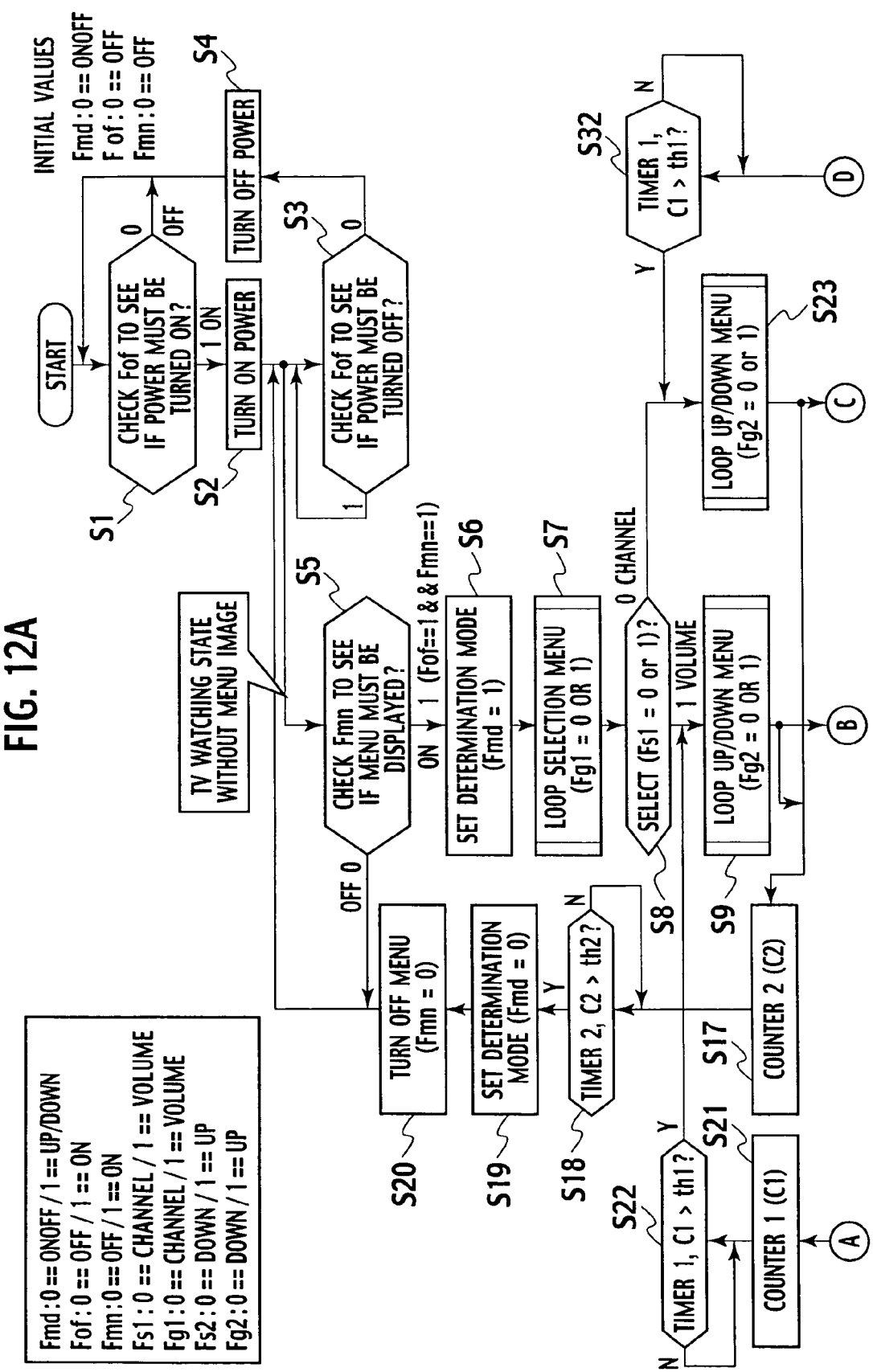
FIG. 12 is a flowchart showing a controlling method carried out in the apparatus of FIG. 1 according to the first embodiment.
Figure 12B:
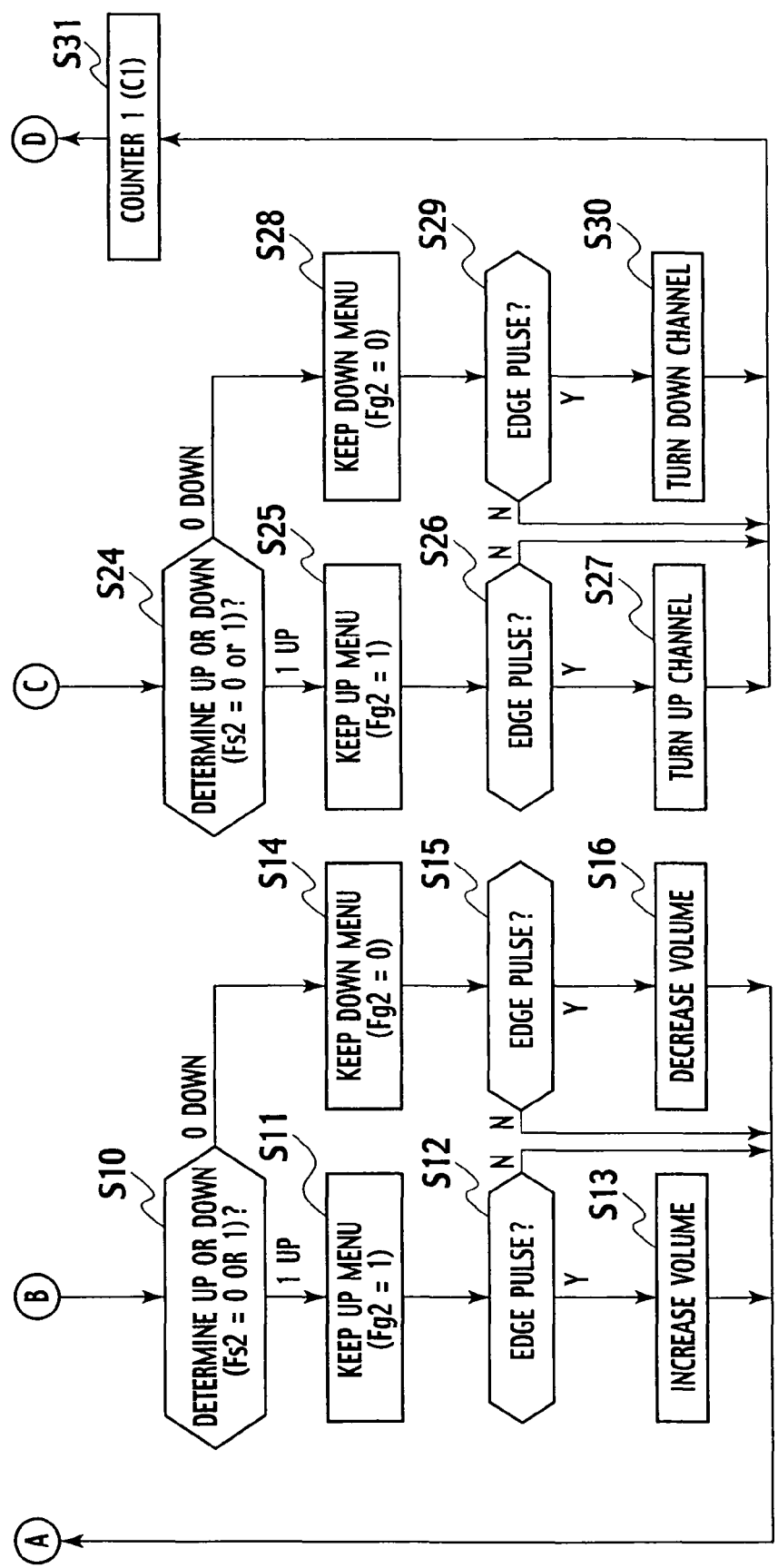

(steps S5 and S6 of FIG. 12). At t12 at which the menu image 3 is displayed, the ON/OFF mode is changed to the selective UP/DOWN mode as shown in (E) of FIG. 13.

When the selective UP/DOWN mode starts, the value of the first active flag Fg1 is toggled between 0 and 1 as shown in (A) of FIG. 13. According to the first embodiment, the sound volume control and channel control are alternately activated. At this time, the menu image 3A containing the active volume button 31a shown in (A) of FIG. 8 and the menu image 3B containing the active channel button 32a shown in (B) of FIG. 8 are alternately displayed on the display 40.

In (A) of FIG. 13, an active control path with the active flag Fg1 of 1 is indicated with a continuous line and an active control operation is surrounded with a serrated circle. In this example, the user wants to decrease the sound volume of the electronic appliance, and therefore, the user makes a clap at t13 at which the sound volume control is active, as shown in (C) of FIG. 13. According to an edge pulse corresponding to the clap, the controller 120 selects the sound volume control (step S8 of FIG. 12).

After the sound volume control is selected, the menu image 7A containing the active up button 71a shown in (A) of FIG. 10 and the menu image 7B containing the active down button 72a shown in (B) of FIG. 10 are alternately displayed on the display 40 (step S9 of FIG. 12). At t14 at which the sound volume decreasing control is active, the user makes a clap as shown in (C) of FIG. 13. Then, the controller 120 determines that the sound volume decreasing control has been selected and keeps the sound volume decreasing control active as shown in (A) of FIG. 13 (steps S10 and S14 of FIG. 12).

The user sees on the display 40 that the sound volume decreasing control is kept active and makes claps to attain a desired volume level. In the example of FIG. 13, the user applies two claps at t15 and t16 as shown in (C) of FIG. 13. Then, the controller 120 adjusts the sound volume of the electronic appliance by "−2" (step S16 of FIG. 12).

After decreasing the sound volume of the electronic appliance to the desired level, the user carries out nothing and leaves the electronic appliance as it is. The controller 120 confirms that no edge pulse has been generated for a predetermined period indicated with the first arrow (corresponding to the threshold th1) shown in (C) of FIG. 13 starting from t16 at which the last edge pulse has been generated according to the last clap. When the predetermined period ends at t17, the controller 120 restarts to alternately activate the up control and down control (step S9 of FIG. 12). At this time, the controller 120 alternately displays the menu images 7A and 7B shown in FIG. 10, to allow the user to correct the sound volume.

If no edge pulse is generated for the predetermined period indicated with the first arrow after t14 at which the down control is kept active, the controller 120 restarts to alternately activate the up control and down control and alternately display the corresponding menu images.

If no edge pulse is generated for a predetermined period indicated with the second arrow (corresponding to the threshold th2) shown in (C) of FIG. 13 from t17, the controller 120 stops at t18 displaying the menu images on the display 40 as shown in (A) of FIG. 13 (steps S17 to S20 of FIG. 12).

At t18 when the menu images are turned off, the controller 120 switches the selective UP/DOWN mode to the ON/OFF mode. At t19, the controller 120 receives a determination signal indicating that four claps have been made and turns off power as shown in (B) of FIG. 13 (steps S3 and S4 of FIG. 12).

In the example of FIG. 13, the menu images are stopped to be displayed at t18. Instead, the sound volume control and channel control may alternately be activated at this time. In this case, the corresponding menu images shown in FIG. 8 are alternately displayed on the display 40.

The above-mentioned controlling method according to the first embodiment employs a simple two-valued control technique using claps to realize a variety of control operations including turning on/off power, turning up/down channel, and increasing/decreasing sound volume.

Figure 14:
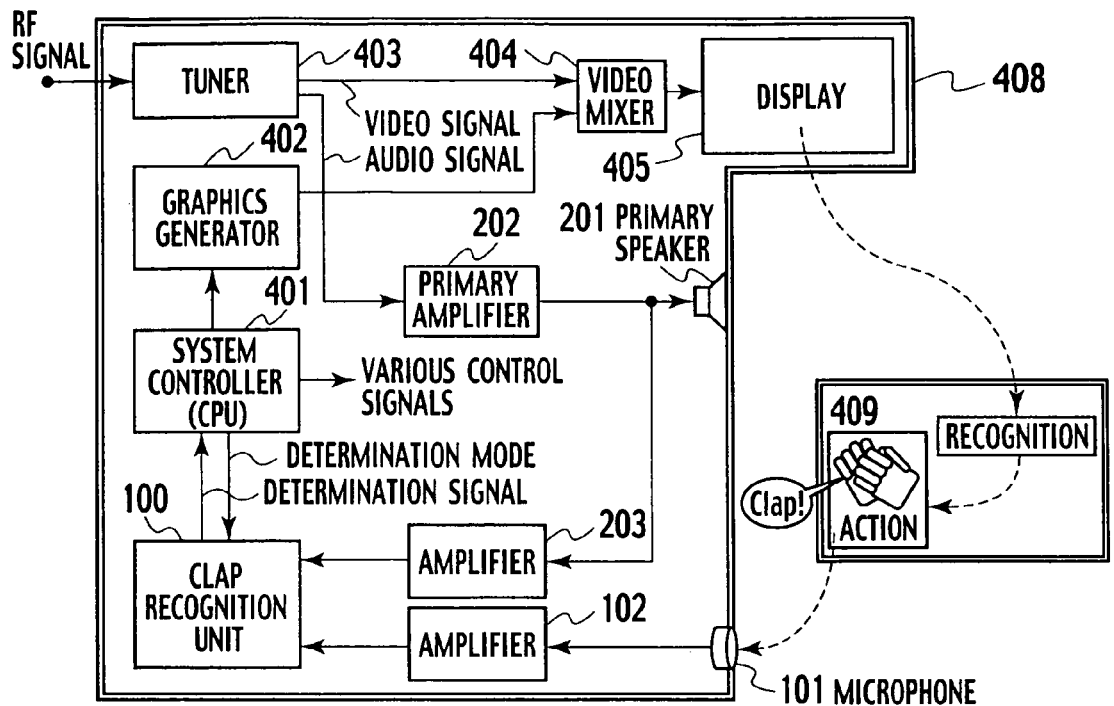
FIG. 14 is a block diagram showing a television set incorporating the controlling apparatus according to the first embodiment of FIG. 1.

Examples of electronic appliances provided with the controlling apparatus of the present invention will be explained. FIG. 14 is a block diagram showing a television set incorporating the controlling apparatus according to the first embodiment of FIG. 1. In FIG. 14, the same parts as those of FIG. 1 are represented with the same reference marks.

In FIG. 14, the television set 408 is encircled with a double line and a user 409 watching the television set 408 is also encircled with a double line. The television set 408 is an electronic appliance that is remotely controlled in response to claps. The television set 408 incorporates the controlling apparatus according to the first embodiment. The controlling apparatus involves a microphone 101, an amplifier 102, a clap recognition unit 100, an amplifier 203, a system controller 401, a graphics generator 402, and a display 405.

The television set 408 receives an RF signal that is made by modulating a television signal with a high-frequency carrier signal. From the received RF signal, a tuner 403 picks up an RF signal of desired channel of a desired broadcasting station, demodulates the picked-up signal, band-compresses the signal, and decodes the signal into a video signal and an audio signal. The audio signal is amplified by a primary amplifier 202 and is supplied to a primary speaker 201. The primary speaker 201 electroacoustically converts the audio signal into sound waves and emits the sound waves into the air. The analog audio output signal from the primary amplifier 202 is amplified by the amplifier 203 and is supplied to the A/D converter 204 of the clap recognition unit 100 (FIG. 1).

The microphone 101 collects environmental sound and acoustoelectrically converts the sound into an analog audio signal. The analog audio signal is amplified by the amplifier 102 and is supplied to the A/D converter 103 of the clap recognition unit 100 (FIG. 1). According to a determination mode specified by the system controller 401, the clap recognition unit 100 recognizes claps. The determination mode is one of the ON/OFF mode and selective UP/DOWN mode mentioned above.

According to the determination mode and the algorithm mentioned above, the clap recognition unit 100 recognizes claps and provides the system controller 401 with a determination signal indicating a result of the recognition.

If the determination mode is the ON/OFF mode, the determination signal indicates that three (ON control) or four (OFF control) edge pulses have been detected and is supplied to the system controller 401. If the determination signal indicates that three edge pulses have been detected, the system controller 401 outputs a control signal to turn on power or display a menu image. If the determination signal indicates that four edge pulses have been detected, the system controller 401 outputs a control signal to turn off power.

If the determination mode is the selective UP/DOWN mode, the clap recognition unit 100 recognizes claps one by one, and therefore, the determination unit 109 (FIG. 1) outputs a determination signal whenever an edge pulse is detected.

The system controller 401 controls the whole of the television set 408 and is made of, for example, a central processing unit (CPU) to turn on/off power, turn on/off menu images, display a proper menu image, adjust sound volume or channel, and control all states of the television set 408. The system controller 401 outputs an appropriate determination mode according to the state of the television set 408, receives a determination signal from the clap recognition unit 100, and outputs a proper control signal to control the television set 408.

The electronic appliance (television set) is controllable with claps according to the present invention as explained in detail with reference to FIGS. 12 and 13. The system controller 401 controls the state transition of the electronic appliance and the clap recognition unit 100 detects claps produced by the user.

If receiving a determination signal indicating that three claps have been detected in the watching state of the television set 408, the system controller 401 outputs a control signal to the graphics generator 402 so that the graphics generator 402 may output a menu image.

The graphics generator 402 provides a video mixer 404 with one of the menu images 3 to 9 shown in FIG. 6 in an active state. The menu images 3 to 9 are associated with control operations, respectively, to be carried out with respect to the television set 408. The menu image supplied to the video mixer 404 shows the user which control operation is active. The system controller 401 controls the graphics generator 402 so that proper menu images are alternately activated and displayed at predetermined intervals. The system controller 401 alternately activates control operations, and in synchronization with this, controls the graphics generator 402 so that menu images corresponding to the control operations are alternately displayed. Namely, the system controller 401 functions as a display controller.

The output signal of the graphics generator 402 is mixed with a broadcasting video signal in the video mixer 404. The mixed video signal is displayed on the display 405. Namely, the display 405 superimposes the menu image provided by the graphics generator 402 on the television broadcasting image.

When receiving a determination signal from the clap recognition unit 100, the system controller 401 determines that the presently active control operation has been selected by the user and executes the control operation. At the same time, the system controller 401 controls the graphics generator 402 so that a menu image corresponding to the selected control operation is displayed on the display 405. If the display 405 is displaying the up menu (FIG. 11) or a down menu in an active state and if the system controller 401 receives a determination signal, the system controller 401 adjusts the sound volume or channel of the television set 408 accordingly.

It is possible to display only a menu image provided by the graphics generator 402 on the display 405. However, it is preferable to superimpose the menu image on a television broadcasting image so that the user can see the menu image as well as the television broadcasting image. There are many superimposition techniques adoptable by the video mixer 404. These techniques, however, are out of the scope of the present invention, and therefore, will not be explained in detail.

The electronic appliance according to the first embodiment shown in FIG. 14 allows the user 409 to properly control the electronic appliance in accordance with menu images displayed on the display 405.

The user 409 can recognize that the electronic appliance is OFF if the display 405 is OFF, i.e., if the display 405 displays nothing. The user can turn on the electronic appliance by applying three claps and can confirm that the electronic appliance is ON from the display 405 displaying an image. If the electronic appliance is ON and if an image such as a television broadcasting image or a video image is not displayed on the display 405, the user 409 can confirm whether or not the electronic appliance is ON by seeing, for example, a pilot lamp (not shown) installed on the electronic appliance (television set 408).

If the user 409 wants to change the channel or sound volume of the television set 408, the user produces three claps to display a proper menu image on the display 405. The user 409 produces claps according to menu images sequentially displayed on the display 405, to carry out the desired control operation with respect to the television set 408.

The electronic appliance according to the first embodiment shown in FIG. 14 is configured so that the user 409 is allowed to select a desired control operation of the electronic appliance while watching the display 405. The user sees a menu image created by the graphics generator 402 to select a desired control operation and selects the desired control operation by producing claps at proper timing to carry out the selected control operation with respect to the electronic appliance.

Figure 15:
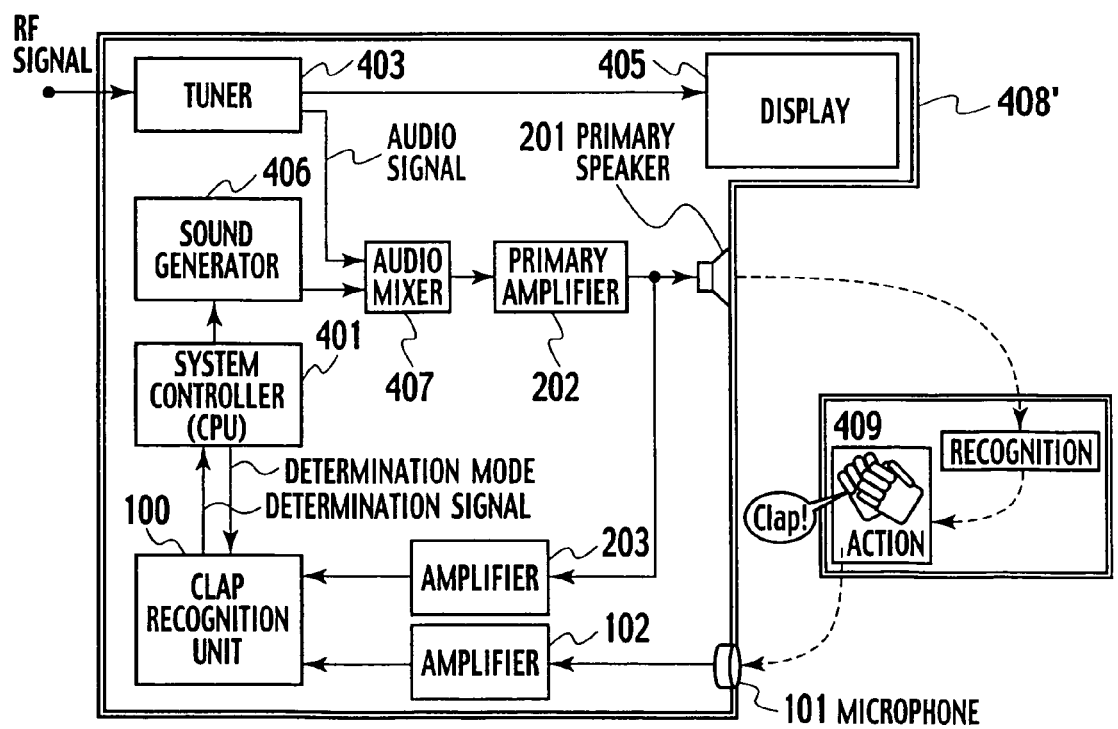
FIG. 15 is a block diagram showing a television set incorporating a controlling apparatus according to a second embodiment of the present invention.

FIG. 15 is a block diagram showing an electronic appliance (television set) incorporating a controlling apparatus according to a second embodiment of the present invention. In FIG. 15, the same parts as those of FIG. 14 are represented with the same reference marks.

The electronic appliance is a television set 408' controllable with claps. The television set 408' incorporates the controlling apparatus according to the second embodiment of the present invention. The controlling apparatus involves a microphone 101, an amplifier 102, a clap recognition unit 100, a primary speaker 201, a primary amplifier 202, an amplifier 203, a system controller 401, a sound generator 406, and an audio mixer 407.

Unlike the first embodiment that provides the user 409 with menu images that allow the user to select a desired one from among a plurality of control operations to be carried out with respect to the electronic appliance, the second embodiment provides the user 409 with a plurality of sounds having different tone colors or intervals associated with control operations to be carried out with respect to the electronic appliance.

The sound generator 406 generates a plurality of sound signals associated with a plurality of control operations of the electronic appliance. The system controller 401 controls the sound generator 406 so that the sound signals are output from the speaker 201 one after another at predetermined intervals. Namely, the system controller 401 functions as a sound signal controller. The sound signals are generated with different tone colors or intervals so that they are aurally distinguishable from one another. A sound signal provided by the sound generator 406 is mixed in the audio mixer 407 with a broadcasting analog audio signal provided by the tuner 403.

The mixed audio signal is amplified by the primary amplifier 202 and is output as sound waves from the primary speaker 201. At the same time, the mixed audio signal is amplified by the amplifier 203 to a predetermined level and is supplied to the clap recognition unit 100.

The user 409 hears the sound emitted from the primary speaker 201, recognizes the tone color or interval of the sound, and applies a clap if the sound is the one associated with a desired control operation, to carry out the control operation with respect to the electronic appliance. To allow the user 409 to carry out a desired control operation such as an up/down control operation according to a heard sound, the user 409 must beforehand memorize, for example, a sound that represents a sound volume control operation or a sound that represents a channel control operation.

Accordingly, it is preferable that the sound-based embodiment is combined with the image-based embodiment, so that the user 409 may grasp from an image which sound is associated with which control operation. When the user 409 becomes familiar with the sound-based control method of the second embodiment, the user 409 may control the electronic appliance without seeing the display 405.

FIG. 16 is a timing chart showing another determination algorithm carried out by the determination unit 109 (FIG. 1) in the selective UP/DOWN mode according to the second embodiment.

According to the first embodiment explained above, the determination unit 109 in the selective UP/DOWN mode outputs a determination signal whenever detecting an edge pulse as shown in FIG. 5. As a result, if a clap-like sound is accidentally generated, the edge pulse generator 108 (FIG. 1) responds to it and generates an edge pulse. Then, the determination unit 109 recognizes that a clap has been produced. This is a trade-off of the clap detection method of the first embodiment that gives priority to ease of use of the user. The first embodiment considers that the control of the electronic appliance by one clap in the selective UP/DOWN mode is mostly achieved within a limited period during which a menu image is displayed and that a control error, even if it happens, is correctable according to menu images.

In some circumstance, there will be a need for a clap detection technique that is more resistive against detection errors when controlling an electronic appliance with claps. According to the algorithm of the selective UP/DOWN mode shown in FIG. 16, the controller 120 (FIG. 1) executes a control operation in the selective UP/DOWN mode when the determination unit 109 detects two edge pulses.

In the selective UP/DOWN mode of FIG. 16, the determination unit 109 outputs a determination signal when detecting two edge pulses. Receiving the determination signal, the controller 120 increments an initial value X to X+1 as shown in (D) of FIG. 16.

With reference to FIG. 16, the technique of controlling the electronic appliance according to two claps will be explained. Edge pulses 701 to 704 shown in (A) of FIG. 16 are provided by the edge pulse generator 108 shown in FIG. 1 in response to detected claps. After gates 705 to 708 shown in (B) of FIG. 16 each are a clap prohibition zone set after a clap, like the first embodiment that executes a control operation in response to one clap. Each after gate has a period shorter than an interval between claps made by an ordinary person. The after gate is prepared just after a fall of an edge pulse corresponding to a clap.

If a clap is generated in any one of the after gates 705 to 708, the clap is invalidated as an accidental sound produced by something other than the user.

When the edge pulse 701 is generated in response to a first clap as shown in (A) of FIG. 16, the determination unit 109 generates the after gate 705 shown in (B) of FIG. 16. If no clap is detected within the after gate 705, the determination unit 109 generates a clap gate 709 for detecting a second clap as shown in (C) of FIG. 16. The clap gate 709 is set at timing counted by the counter 110 (FIG. 3) in the determination unit 109. If the edge pulse 702 based on a second clap is within the clap gate 709, the second clap is validated.

The period (allowable clap range) of the clap gate 709 is indicated with an arrow and a dotted line in (C) of FIG. 16. When the edge pulse 702 corresponding to the second clap rises, the clap gate 709 falls as indicated with a continuous line. Just after the second edge pulse 702, the determination unit 109 creates the after gate 706.

According to the technique of FIG. 16, the determination processor 111 (FIG. 3) recognizes, after the recognition of the first edge pulse 701, the second edge pulse 702 only if no edge pulse is detected within the after gate 705, the second edge pulse 702 is detected within the clap gate 709, and no edge pulse is detected within the after gate 706. Only if these conditions are entirely met, the determination processor 111 determines that two edge pulses have been detected and outputs a determination signal.

In response to the determination signal, the controller 120 (FIG. 1) increments an initial value X to X+1 at the end of the after gate 706, as shown in (D) of FIG. 16. The timing of this increment is a first determination point.

Similarly, the determination processor 111 checks to see if no edge pulse is detected within the after gate 707 after the generation of the edge pulse 703, the edge pulse 704 is detected within a clap gate 710, and no edge pulse is detected within the after gate 708. If these conditions are met, the determination processor 111 outputs a determination signal indicating two edge pulses have been detected.

In response to the determination signal, the controller 120 outputs a control signal to increment X+1 to X+2 at the end of the after gate 708 as shown in FIG. 16. The timing of this increment is a second definition point. In response to the two claps that are generated in series within a predetermined period, the controller 120 controls the electronic appliance.

The above is the selective UP/DOWN mode in which the determination unit 109 outputs a determination signal after detecting two edge pulses. This technique improves resistance to clap detection/recognition errors through setting the second clap gate (709, 710), confirming two edge pulses, and checking two after gates.

The selective UP/DOWN mode may realize speedy determination and control according to one or a plurality of claps made by the user in combination with menu images generated by the graphics generator 402 (FIG. 14).

The technique of controlling an electronic appliance with claps according to the present invention is capable of turning on/off power, displaying or erasing menu images, selecting control operations such as volume and channel adjustments, and incrementing or decrementing values. The present invention allows a user to conduct various control operations with respect to an electronic appliance from a remote location.

According to the present invention, one among a plurality of menu images associated with control operations of an electronic appliance is displayed in an active state. If edge pulses are generated in response to a series of sound waves generated for controlling the electronic appliance, a control operation associated with the menu image that is displayed in an active state at the moment is carried out with respect to the electronic appliance. Any control operation associated with a menu image can be carried out with respect to the electronic appliance. Even if a remote controller is not in the user's hand or even if the user is unable to manipulate the remote controller, the present invention responds to sound waves generated by the user and executes any control operation with respect to the electronic appliance such as turning on/off the electronic appliance.

If the controller 120 stops alternately displaying menu images and if no edge pulse is generated for a predetermined period (th1) after the stoppage, the present invention restarts to alternately display the menu images. Accordingly, the user can perform a control operation that may be different from the preceding control operation.

According to the embodiments mentioned above, the user selects one of two control operations presented for the user and the controller 120 carries out the selected control operation with respect to the electronic appliance. According to an embodiment of the present invention, the user may select one from among three or more control operations. In this case, the controller 120 activates the control operations one after another and executes the one for which claps are generated.

A clap according to the present invention is producible by clapping hands, by hitting a part of the body or an object with a hand, or by hitting an object with another object. Namely, the clap may be any sound that is distinguishable like an impulse.

The present invention is not limited to the above-mentioned embodiments. For example, the clap recognition process explained with reference to FIGS. 1 to 4 or the flowchart of FIG. 12 can be realized in the form of an electronic appliance controlling program executed by computer. Such a program may be stored in a recording medium to be read by computer, or may be distributed through a communication network to a computer. The program may be incorporated in an electronic appliance.

Furthermore, it should be understood that many modifications and adaptations of the invention will become apparent to those skilled in the art and it is intended to encompass such obvious modifications and changes in the scope of the claims appended hereto.

What is claimed is:

1. A method of controlling an electronic appliance, comprising:
    collecting a sound wave generated for controlling the electronic appliance;
    acoustoelectrically converting the collected sound wave into a sound signal;
    generating an edge signal according to the sound signal, the edge signal indicating the generation timing of the sound wave;
    generating an edge pulse according to the edge signal;
    after a predetermined number of edge pulses are generated, displaying one of a plurality of control images, the respective control images being associated with a plurality of control operations of the electronic appliance, on a display of the electronic appliance in an active state in which the associated control operation is executable, and displaying the other control images on the display in an inactive state in which the associated control operations are not executable;
    if no edge pulse is generated within a predetermined period that one control image is displayed on the display in the active state, switching between the plurality of control images to switch the one control image from the active state to the inactive state and switch another control image adjacent to the one control image from the inactive state to the active state; and
    carrying out the control operation associated with a control image displayed in an active state on the display at the time when the edge pulse is generated.

2. The method of claim 1, further comprising:
    turning on the electronic appliance if a predetermined number of edge pulses are generated in an OFF state of the electronic appliance and turning off the electronic appliance if a predetermined number of edge pulses are generated in an ON state of the electronic appliance.

3. The method of claim 1, further comprising:
    stopping displaying the plurality of control images if no edge pulse is generated within a first set period that is longer than a period in which all of the plurality of control images displayed on the display are cyclically displayed in the active state.

4. The method of claim 1, further comprising:
    stopping switching between the plurality of control images when an edge pulse is generated within the predetermined period; and
    resuming switching between the plurality of control images if no edge pulse is generated within a second set period from the generation of the edge pulse.

5. The method of claim 1, further comprising:
    stopping switching between the plurality of control images when an edge pulse is generated within the predetermined period; and
    resuming switching between the plurality of control images if edge pulses are generated after the stopping of switching and if no edge pulse is generated within a second set period after the last one of the edge pulses generated after the stopping of switching.

6. The method of claim 1, further comprising:
    generating an absolute-value sound signal from the sound signal by using an average level of the sound signal as a reference, wherein:
    the edge signal is generated by extracting a part of the absolute-value sound signal that has a high-frequency component exceeding a predetermined frequency and a level exceeding a first threshold; and
    the edge pulse is generated when the level of the generated edge signal exceeds a second threshold.

7. The method of claim 1, further comprising:
    after a predetermined number of edge pulses are generated, outputting one of a plurality of control sounds from a speaker, the respective output control sounds being associated with the plurality of control images;
    if no edge pulse is generated within a predetermined period, switching between the plurality of control sounds at predetermined intervals; and
    carrying out the control operation associated with a control sound output at the time when an edge pulse is generated.

8. An apparatus for controlling an electronic appliance, comprising:
    a sound collector configured to collect a series of sound waves generated at predetermined intervals for controlling the electronic appliance and acoustoelectrically convert the collected sound waves into a sound signal;
    an edge signal extractor configured to generate an edge signal according to the sound signal, the edge signal indicating individual generation timing of the series of sound waves;
    an edge pulse generator configured to generate an edge pulse according to the edge signal;
    a display;
    a display controller configured to display one of a plurality of control images, the respective control images being associated with a plurality of control operations of the electronic appliance, on a display of the electronic appliance in an active state in which the associated control operation is executable, and display the other control images on the display in an inactive state in which the associated control operations are not executable, and configured to, if no edge pulse is generated within a predetermined period that one control image is displayed on the display in the active state, switch between the plurality of control images to switch the one control image from the active state to the inactive state and switch another control image adjacent to the one control image from the inactive state to the active state; and
    an operation controller configured to carry out the control operation associated with a control image displayed in the active state on the display at the time when the edge pulse is generated.

9. The apparatus of claim 8, wherein the display controller displays one of the plurality of control images in the active state on the display after a predetermined number of edge pulses are generated.

10. The apparatus of claim 8, further comprising:
a power controller configured to turn on the electronic appliance if a predetermined number of edge pulses are generated in an OFF state of the electronic appliance and turn off the electronic appliance if a predetermined number of edge pulses are generated in an ON state of the electronic appliance.

11. The apparatus of claim 8, wherein:
the display controller stops displaying the plurality of control images if no edge pulse is generated by the edge pulse generator within a first set period that is longer than a period in which all of the plurality of control images displayed on the display are displayed in the active state.

12. The apparatus of claim 8, wherein the display controller:
stops switching between the plurality of control images when an edge pulse is generated within a predetermined period; and
resumes switching between the plurality of control images if no edge pulse is generated within a second set period from the generation of the edge pulse.

13. The apparatus of claim 8, wherein the display controller:
stops switching between the plurality of control images when an edge pulse is generated within the predetermined period; and
resumes switching between the plurality of control images if edge pulses are generated after the stopping of switching and if no edge pulse is generated within a second set period after the last one of the edge pulses generated after the stopping of switching.

14. The apparatus of claim 8, further comprising:
an absolute-value unit configured to generate an absolute-value sound signal from the sound signal provided by the sound collector, by using an average level of the sound signal as a reference, wherein:
the edge signal extractor generates an edge signal by extracting a part of the absolute-value sound signal that has a high-frequency component exceeding a predetermined frequency and a level exceeding a first threshold; and
the edge pulse generator generates an edge pulse when the level of the generated edge signal exceeds a second threshold.

15. The method of claim 8, further comprising:
a speaker configured to electroacoustically convert a sound signal into an acoustic signal;
a sound signal controller configured to, after a predetermined number of edge pulses are generated, output one of a plurality of control sounds from the speaker, the respective output control sounds being associated with the plurality of control images, and cyclically output the plurality of control sounds at predetermined intervals; and
an operation controller configured to carry out the control operation associated with a control sound output at the time when an edge pulse is generated.

* * * * *